United States Patent
Wakizaka et al.

(10) Patent No.: US 9,190,670 B2
(45) Date of Patent: Nov. 17, 2015

(54) CATALYST, PRODUCTION PROCESS THEREFOR, AND USE THEREOF

(75) Inventors: Yasuaki Wakizaka, Chiba (JP); Takuya Imai, Chiba (JP); Toshikazu Shishikura, Chiba (JP); Ryuji Monden, Chiba (JP); Kenichiro Ota, Koganei (JP)

(73) Assignee: SHOWA DENKO K.K., Tokyo (JP)

( * ) Notice: Subject to any disclaimer, the term of this patent is extended or adjusted under 35 U.S.C. 154(b) by 1056 days.

(21) Appl. No.: 13/266,562

(22) PCT Filed: Apr. 27, 2010

(86) PCT No.: PCT/JP2010/057414
§ 371 (c)(1),
(2), (4) Date: Oct. 27, 2011

(87) PCT Pub. No.: WO2010/126020
PCT Pub. Date: Nov. 4, 2010

(65) Prior Publication Data
US 2012/0094207 A1   Apr. 19, 2012

(30) Foreign Application Priority Data

Apr. 28, 2009 (JP) .................................. 2009-109530

(51) Int. Cl.
| | |
|---|---|
| *H01M 4/86* | (2006.01) |
| *H01M 4/90* | (2006.01) |
| *B01J 27/24* | (2006.01) |
| *H01M 8/10* | (2006.01) |

(52) U.S. Cl.
CPC .............. *H01M 4/9016* (2013.01); *B01J 27/24* (2013.01); *H01M 2008/1095* (2013.01); *Y02E 60/50* (2013.01)

(58) Field of Classification Search
CPC combination set(s) only.
See application file for complete search history.

(56) References Cited

U.S. PATENT DOCUMENTS

| 8,007,691 B2 | 8/2011 | Sawaki et al. |
| 2009/0202869 A1 | 8/2009 | Sawaki et al. |

(Continued)

FOREIGN PATENT DOCUMENTS

| EP | 1852180 A1 | 11/2007 |
| JP | 2006-198570 A | 8/2006 |
| JP | 2007-031781 A | 2/2007 |

(Continued)

OTHER PUBLICATIONS

Supplementary European Search Report dated Oct. 9, 2013 for corresponding European Patent Application No. 10769718.7.

(Continued)

*Primary Examiner* — Jacob Marks
(74) *Attorney, Agent, or Firm* — Sughrue Mion, PLLC

(57) ABSTRACT

The invention provides catalysts that are not corroded in acidic electrolytes or at high potential and have excellent durability and high oxygen reducing ability. The catalyst includes a metal element M, carbon, nitrogen and oxygen, wherein the catalyst shows peaks at 1340 cm$^{-1}$ to 1365 cm$^{-1}$ and at 1580 cm$^{-1}$ to 1610 cm$^{-1}$ as analyzed by Raman spectroscopy and the metal element M is one selected from titanium, iron, niobium, zirconium and tantalum. The catalysts of the invention are stable and are not corroded in acidic electrolytes or at high potential, have high oxygen reducing ability and are inexpensive compared to platinum. Fuel cells having the catalysts are therefore relatively inexpensive and have high performance.

13 Claims, 9 Drawing Sheets

(56) References Cited

U.S. PATENT DOCUMENTS

2010/0227253 A1* 9/2010 Monden et al. .............. 429/485
2011/0020729 A1* 1/2011 Monden et al. .............. 429/483

FOREIGN PATENT DOCUMENTS

| JP | 2007-257888 A | 10/2007 |
| JP | 2008-4286 A | 1/2008 |
| JP | 2008-108594 A | 5/2008 |
| WO | 2009031383 A1 | 3/2009 |
| WO | WO 2009/119523 | * 10/2009 |

OTHER PUBLICATIONS

Jin-Hwan Kim, et al.; "Oxygen Reduction Reaction of Ta—C—N Prepared by Reactive Sputtering with Heat Treatment"; Electrochemistry; vol. 75, No. 2; Jan. 1, 2007; pp. 166-168.

Yoshiro Ohgi, et al.; "Catalytic Activity of Partially Oxidized Transition-metal Carbide-Nitride for Oxygen Reduction Reaction in Sulfuric Acid"; Chemistry Letters; Vo. 37, No. 6; Jan. 1, 2008; pp. 208-609.

Jeanne E Panels, et al.; "Synthesis and characterization of magnetically active carbon nanofiber/iron oxide composites with hierarchical pore structures"; Nanotechnology; vol. 19; No. 45; Nov. 12, 2008; pp. 1-7.

Y. Ohgi, et al; "Zirconium oxide-based compound as new cathode without platinum group metals for PEFC"; ECS Transactions; vol. 25, No. 1; Oct. 1, 2009; pp. 129-139.

Doi et al., "Zirconium-Based Compounds for Cathode of Polymer Electrolyte Fuel Cell", Journal of the Electrochemical Society, 2007, vol. 154, No. 3, pp. B362-B369.

* cited by examiner

CATALYST, PRODUCTION PROCESS THEREFOR, AND USE THEREOF

TECHNICAL FIELD

The present invention relates to catalysts, processes for producing the same, and uses of the catalysts.

BACKGROUND ART

A catalyst accelerates the rate of a chemical equilibrium reaction by lowering the activation energy of the reaction and is used in a wide range of chemical reaction processes such as synthesis and decomposition processes. Catalysts are categorized into homogeneous catalysts and heterogeneous catalysts. For example, a homogeneous catalyst is composed of a catalytic substance that is dispersed, for example dissolved, in a solvent. The use of the homogeneous catalyst allows for efficient synthesis of a target compound in a liquid phase or the like. A heterogeneous catalyst is composed of a catalytic substance immobilized on a carrier. The heterogeneous catalyst efficiently catalyzes synthesis or decomposition of a target substance and can be easily separated and recovered from the product. Thus, the heterogeneous catalysts are particularly useful in large-scale chemical synthesis plants. An electrode catalyst is a heterogeneous catalyst in which a catalytic substance is immobilized on the surface of an electrode. The electrode catalyst permits an electrochemical reaction to proceed at a lower overvoltage. In particular, the electrode catalysts are needed in fuel cells for the purposes of lowering the overvoltage and generating larger amounts of electrical energy.

Fuel cells are classified into several types according to the electrolytes or the electrodes used therein. Typical types are alkaline types, phosphoric acid types, molten carbonate types, solid electrolyte types and polymer electrolyte types. In particular, polymer electrolyte fuel cells that can operate at temperatures ranging from low temperatures (about −40° C.) to about 120° C. have attracted attention and have been progressively developed and practically used as low-pollution power sources for automobiles. The polymer electrolyte fuel cells are expected to be used as automobile drive sources or stationary power sources. However, the use in these applications requires long-term durability.

The polymer electrolyte fuel cell has a solid polymer electrolyte sandwiched between an anode and a cathode. A fuel is fed to the anode, and oxygen or air is supplied to the cathode, whereby oxygen is reduced at the cathode to produce electricity. The fuel is usually hydrogen or methanol.

To increase the reaction rate in a fuel cell and enhance the energy conversion efficiency, a layer containing a catalyst (hereinafter, also referred to as "fuel cell catalyst layer") is conventionally provided on the surface of a cathode (an air electrode) or an anode (a fuel electrode) of a fuel cell.

Here, noble metals are generally used as the catalysts. Of the noble metals, platinum that is stable at high potential and has high activity is most frequently used. However, since platinum is expensive and exists in a limited amount, alternative catalysts have been desired.

Further, the noble metals used on the cathode surface are often dissolved in an acidic atmosphere and are not suited in applications requiring long-term durability. Accordingly, it has been strongly demanded that catalysts be developed which are not corroded in an acidic atmosphere and have excellent durability and high oxygen reducing ability.

Materials containing nonmetals such as carbon, nitrogen and boron have captured attention as alternative catalysts to platinum. The materials containing these nonmetals are inexpensive compared to the noble metals such as platinum and are abundant.

Nonpatent Literature 1 reports that zirconium-based ZrOxN compounds show oxygen reducing ability.

Patent Literature 1 discloses, as platinum-alternative materials, oxygen-reducing electrode materials containing a nitride of one or more elements selected from Groups 4, 5 and 14 in the long periodic table.

However, the materials containing these nonmetals do not have sufficient oxygen reducing ability for practical use as catalysts.

Patent Literature 2 considers the possibility for a perovskite oxide containing two or more metals to be used as a platinum-alternative catalyst. However, as demonstrated in Examples, the oxide does not show sufficient activity and only serves as a carrier which assists platinum.

Meanwhile, platinum is useful not only as a fuel cell catalyst as described above but as a catalyst in exhaust gas treatment or organic synthesis. However, the expensiveness and the limited amount of platinum have created a need of alternative catalysts in these applications as well.

CITATION LIST

Patent Literatures

Patent Literature 1: JP-A-2007-31781
Patent Literature 2: JP-A-2008-4286

Nonpatent Literature

Nonpatent Literature 1: S. Doi, A. Ishihara, S. Mitsushima, N. Kamiya, and K. Ota, Journal of The Electrochemical Society, 154 (3) B362-B369 (2007)

SUMMARY OF INVENTION

Technical Problem

The present invention is aimed at solving the problems in the background art described above. It is therefore an object of the invention to provide catalysts that are not corroded in acidic electrolytes or at high potential and have excellent durability and high oxygen reducing ability.

Solution to Problem

The present inventors carried out studies to solve the conventional problems in the art. They have then found that catalysts containing a metal element M, carbon, nitrogen and oxygen wherein the catalyst has at least a carbon-carbon-carbon bond and the metal element M is one selected from titanium, iron, niobium, zirconium and tantalum are not corroded in acidic electrolytes or at high potential and have excellent durability and high oxygen reducing ability. The present invention has been completed based on the finding.

For example, the present invention is concerned with the following (1) to (14).

(1) A catalyst comprising a metal element M, carbon, nitrogen and oxygen, wherein the catalyst shows peaks at 1340 $cm^{-1}$ to 1365 $cm^{-1}$ and at 1580 $cm^{-1}$ to 1610 $cm^{-1}$ as analyzed by Raman spectroscopy and the metal element M is one selected from the group consisting of titanium, iron, niobium, zirconium and tantalum.

(2) The catalyst described in (1), wherein the ratio D/G is not less than 0.1 and not more than 10 wherein D is the height of the peak at 1340 cm$^{-1}$ to 1365 cm$^{-1}$ and G is the height of the peak at 1580 cm$^{-1}$ to 1610 cm$^{-1}$ (wherein the heights D and G do not include the height of the baseline).

(3) The catalyst described in (1) or (2), wherein the concentration of carbon forming sp2 bonds and sp3 bonds is not less than 1 wt % in terms of furnace black as measured by Raman spectroscopy and a standard addition method.

(4) The catalyst described in any one of (1) to (3), which is represented by the compositional formula $MC_xN_yO_z$ (wherein x, y and z represent a ratio of the numbers of the atoms, $0.01 \leq x \leq 10000$, $0.01 \leq y \leq 10$, and $0.02 \leq z \leq 3$).

(5) The catalyst described in any one of (1) to (4), which is a fuel cell catalyst.

(6) A process for producing the catalyst described in any one of (1) to (5), which comprises a step of reacting a gas of a compound containing a metal element M, a hydrocarbon gas, a nitrogen compound gas and an oxygen compound gas at 600 to 1600° C., the metal element M being selected from the group consisting of titanium, iron, niobium, zirconium and tantalum.

(7) A process for producing the catalyst described in any one of (1) to (5), which comprises a step of heating a metal carbonitride containing a metal element M in an inert gas containing oxygen gas, the metal element M being selected from the group consisting of titanium, iron, niobium, zirconium and tantalum.

(8) The process described in (7), wherein the heating is performed at a temperature in the range of 400 to 1400° C.

(9) A fuel cell catalyst layer comprising the catalyst described in any one of (1) to (5).

(10) The fuel cell catalyst layer described in (9), which further comprises electron conductive particles.

(11) An electrode comprising a fuel cell catalyst layer and a porous support layer, wherein the fuel cell catalyst layer is the fuel cell catalyst layer described in (9) or (10).

(12) A membrane electrode assembly comprising a cathode, an anode and an electrolyte membrane interposed between the cathode and the anode, wherein the cathode and/or the anode is the electrode described in (11).

(13) A fuel cell comprising the membrane electrode assembly described in (12).

(14) A polymer electrolyte fuel cell comprising the membrane electrode assembly described in (12).

Advantageous Effects of Invention

The catalysts according to the invention are stable and are not corroded in acidic electrolytes or at high potential, have high oxygen reducing ability and are inexpensive compared to platinum. The fuel cells having the catalysts are therefore relatively inexpensive and have high performance.

DESCRIPTION OF EMBODIMENTS

⟨Catalysts⟩

Figure 1A:
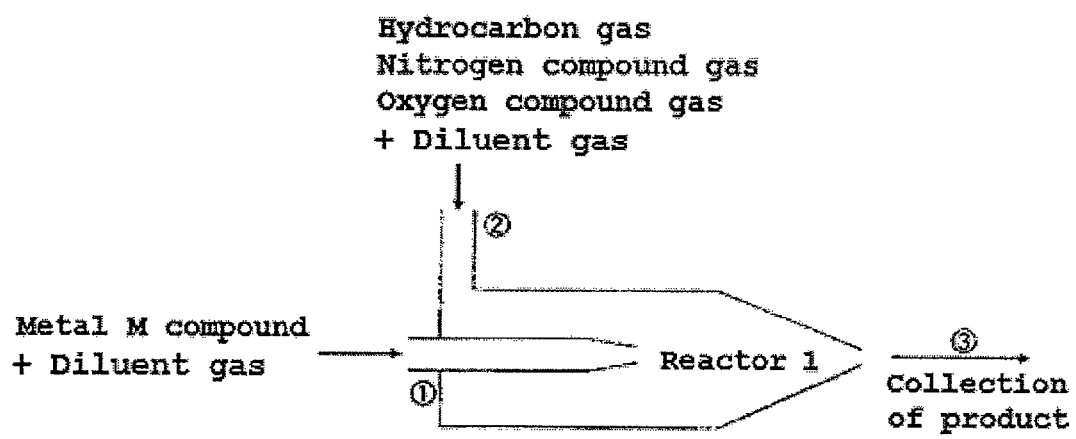
FIG. 1a is a schematic view illustrating a reactor in a one-stage gas phase reaction.

A catalyst according to the present invention contains a metal element M, carbon, nitrogen and oxygen. The catalyst shows peaks at 1340 cm$^{-1}$ to 1365 cm$^{-1}$ and at 1580 cm$^{-1}$ to 1610 cm$^{-1}$ as analyzed by Raman spectroscopy. The metal element M is one selected from the group consisting of titanium, iron, niobium, zirconium and tantalum. The catalyst is not corroded in acidic electrolytes or at high potential, has excellent durability and high oxygen reducing ability, and is inexpensive compared to platinum. The metal element M being titanium, iron, niobium or zirconium is more advantageous in the industry from the viewpoint of material cost. Titanium or iron is particularly preferable because the catalyst shows higher oxygen reducing ability.

When the catalyst is analyzed by Raman spectroscopy, it shows peaks at 1340 cm$^{-1}$ to 1365 cm$^{-1}$ and at 1580 cm$^{-1}$ to 1610 cm$^{-1}$, which are referred to as the band D and the band G, respectively. The band D is a peak due to defects in the crystal and indicates the presence of sp3 bonds among the carbon-carbon bonds. The band G is a peak assigned to graphite-like bonds, namely sp2 bonds. The catalyst that shows these peaks contains carbon forming sp2 bonds and sp3 bonds and tends to achieve good conductivity and catalytic activity required for an electrode catalyst.

The peak that is observed at 1580 cm$^{-1}$ to 1610 cm$^{-1}$ when the catalyst is analyzed by Raman spectroscopy is probably due to carbon-carbon unsaturated bonds in the catalyst. The peak that is observed at 1340 cm$^{-1}$ to 1365 cm$^{-1}$ in Raman spectroscopy of the catalyst is considered to be assigned to carbon-carbon saturated bonds in the catalyst.

The present inventors assume that carbon-carbon-carbon bonds are present in the catalyst. The catalyst containing carbon-carbon-carbon bonds tends to show higher oxygen reduction activity and is thus preferable. More preferably, at least one carbon-carbon bond in the carbon-carbon-carbon bond is an unsaturated bond. Such a catalyst tends to show higher conductivity by delocalizing electrons.

The Raman spectrum obtained by Raman spectroscopy shows broad peaks at times. In the invention, the peaks in Raman spectroscopy refer to peaks that are observed at specific wavenumbers when a sample is irradiated with a laser beam and the scattered light is dispersed. A signal that is detected with a signal (S) to noise (N) ratio (S/N) of 3 or more is regarded as a spectrum peak. Here, the noise (N) is the width of the baseline.

The carbon giving rise to the band G has high crystallinity. That is, the carbon has high electron conductivity and can form paths through which the electrode catalyst supplies electrons. On the other hand, the band D is ascribed to defects in carbon which possibly contribute to the reaction by allowing the reactants to be easily adsorbed thereto. The present invention specifies the optimum ratio of the proportion of the carbon giving rise to the band D and that of the carbon showing the band G.

That is, the catalyst of the invention preferably has a ratio D/G of not less than 0.1 and not more than 10 wherein D is the height of the peak at 1340 cm$^{-1}$ to 1365 cm$^{-1}$ and G is the height of the peak at 1580 cm$^{-1}$ to 1610 cm$^{-1}$ (wherein the heights D and G do not include the height of the baseline). When the ratio D/G is from 0.1 to 10, electrons are considered to be supplied to highly active sites and such a catalyst is desirable as an electrode catalyst. The ratio D/G is more preferably not less than 0.3 and not more than 3, and still more preferably not less than 0.5 and not more than 2. This D/G ratio ensures that the catalyst shows higher activity as an electrode catalyst. When the D/G ratio is from 0.6 to 1.2, the catalyst tends to show very high performance as a fuel cell catalyst.

In an embodiment of the catalyst of the invention, the concentration of carbon forming sp2 bonds and sp3 bonds is preferably not less than 1 wt % in terms of furnace black as measured by Raman spectroscopy and a standard addition method. The concentration is more preferably not less than 2 wt %, and still more preferably not less than 5 wt %. This concentration of carbon forming sp2 bonds and sp3 bonds tends to result in the catalyst being excellent in oxygen reduction activity.

The concentration of carbon forming sp2 bonds and sp3 bonds in the catalyst can be measured by Raman spectroscopy and a standard addition method. In the standard addition method, a standard substance (in the present invention, furnace black (e.g., carbon VULCAN XC72 manufactured by Cabot Corporation)) is added in predetermined concentrations to samples and a calibration curve is prepared, from which the concentration of sp2-bonded carbon and sp3-bonded carbon in the catalyst that is an unknown sample is determined. In an exemplary procedure for the preparation of the calibration curve, a sample to be analyzed is placed into 4 or more containers and furnace black (e.g., carbon VULCAN XC72 manufactured by Cabot Corporation) is added to each of the containers in differing concentrations, and a calibration curve is prepared which shows the relationship between the Raman spectroscopy intensity and the concentration. If the Raman spectroscopy sample is illuminated with an intensive laser light, the illuminated spot is brought to a high temperature. Performing Raman spectroscopy in the open-air atmosphere results in the sample being oxidized with oxygen in the air. The measurement in both cases may not give accurate results. In order to obtain the accurate results, the measurement is performed by applying a laser light to the sample that is hermetically sealed with argon in a glass sample tube.

The catalyst of the invention is preferably represented by the compositional formula $MC_xN_yO_z$ (wherein x, y and z represent a ratio of the numbers of the atoms, $0.01 \leq x \leq 10000$, $0.01 \leq y \leq 10$, and $0.02 \leq z \leq 3$).

In the compositional formula $MC_xN_yO_z$, x, y and z are more preferably $0.01 \leq x \leq 1000$, $0.01 \leq y \leq 6$ and $0.02 \leq z \leq 2.5$, still more preferably $0.01 \leq x \leq 500$, $0.01 \leq y \leq 5$ and $0.02 \leq z \leq 2$, particularly preferably $0.01 \leq x \leq 10$, $0.01 \leq y \leq 5$ and $0.02 \leq z \leq 2$, and extremely preferably $0.01 \leq x \leq 2$, $0.01 \leq y \leq 1$ and $0.02 \leq z \leq 2$. When x, y and z in the compositional formula $MC_xN_yO_z$ are in these ranges, the catalyst tends to show higher activity.

As long as the metal element M, carbon, nitrogen and oxygen are detected when the catalyst is analyzed by elemental analysis, the catalyst of the invention may be a single compound containing the metal element M, carbon, nitrogen and oxygen, or a mixture including, for example, a metal element M oxide, a metal element M carbide, a metal element M nitride, a metal element M carbonitride, a metal element M oxycarbide and a metal element M oxynitride (the mixture may contain or may not contain a compound containing the metal element M, carbon, nitrogen and oxygen).

In the case where the catalyst of the invention is a mixture, it is difficult to determine the proportions of carbon, nitrogen and oxygen in each of the compounds. According to the invention, however, higher activity tends to be achieved when the proportions of carbon, nitrogen and oxygen in the whole catalyst satisfy the aforementioned compositional formula $MC_xN_yO_z$.

The catalyst according to the present invention is preferably a fuel cell catalyst.

The catalyst in the invention preferably has an oxygen reduction onset potential of not less than 0.5 V as measured versus a reversible hydrogen electrode (vs. NHE) by the measurement method (A) described below.

[Measurement Method (A)]

The catalyst and carbon as electron conductive particles are added to a solvent, and the mixture is ultrasonically stirred to give a suspension in which the catalyst and the electron conductive carbon particles on which the catalyst is dispersed account for 1 wt %. The carbon herein is carbon black (specific surface area: 100-300 m$^2$/g) (e.g., XC-72 manufactured by Cabot Corporation), and the catalyst is dispersed therein with a catalyst:carbon weight ratio of 95:5. The solvent is a mixture of isopropyl alcohol:water=2:1 (by weight).

While ultrasonicating the suspension, a 10 μl portion thereof is collected and is quickly dropped onto a glassy carbon electrode (diameter: 5.2 mm) and dried at 120° C. for 5 minutes to form a fuel cell catalyst layer containing the catalyst on the glassy carbon electrode. The dropping and drying operations are repeated until at least 1.0 mg of the fuel cell catalyst layer is formed on the carbon electrode surface.

Subsequently, 10 μl of Nafion (registered trademark) (a 5% Nafion solution (DE521) manufactured by Du Pont Kabushiki Kaisha) diluted ten times with pure water is dropped onto the fuel cell catalyst layer and is dried at 120° C. for 1 hour.

The electrode manufactured above is polarized in a 0.5 mol/dm$^3$ sulfuric acid solution at 30° C. under an oxygen atmosphere or a nitrogen atmosphere at a potential scanning rate of 5 mV/sec, thereby recording a current-potential curve. As a reference, a reversible hydrogen electrode is polarized in a sulfuric acid solution of the same concentration. In the current-potential curve, the potential at which the reduction current starts to differ by 0.5 μA/cm$^2$ or more between the polarization under the oxygen atmosphere and that under the nitrogen atmosphere is obtained as the oxygen reduction onset potential.

If the oxygen reduction onset potential is less than 0.7 V (vs. NHE), the use of the catalyst in a fuel cell cathode may cause the generation of hydrogen peroxide. For the oxygen reduction, the oxygen reduction onset potential is preferably 0.85 V (vs. NHE) or above. A higher oxygen reduction onset potential is more preferable. The upper limit of the oxygen reduction onset potential is not particularly limited but is theoretically 1.23 V (vs. NHE).

The fuel cell catalyst layer according to the invention that is prepared using the inventive catalyst is preferably used in an acidic electrolyte at a potential of not less than 0.4 V (vs. NHE). The upper limit of the potential depends on the stability of the electrode. The electrode according to the invention may be used at as high a potential as about 1.23 V (vs. NHE) which is the oxygen generation potential.

At a potential of less than 0.4V (vs. NHE), the compound can exist stably but oxygen cannot be reduced favorably. Catalyst layers having such a low potential are not useful as fuel cell catalyst layers used in membrane electrode assemblies for fuel cells.

In the use of the inventive catalyst as an electrode catalyst, the catalyst is sometimes used in combination with an additive for adding conductivity, in detail carbon black such as VULCAN XC72 or Ketjen black in the form of electron conductive particles. However, the catalyst of the invention is detected to contain carbon by elemental analysis even when such a conductivity enhancing additive has not been mixed.

For example, the catalyst of the invention may be obtained by reacting a gas of a compound containing the metal element M, a hydrocarbon gas, a nitrogen compound gas and an oxygen compound gas at 600 to 1600° C. Alternatively, the catalyst may be obtained by heating a metal carbonitride containing the metal element M in an inert gas containing oxygen gas. These production processes for the catalysts will be described below.

⟨Catalyst Production Processes⟩

The processes for producing the catalysts of the invention are not particularly limited. Exemplary processes include gas-phase catalyst production processes and solid-phase catalyst production processes.

A gas-phase catalyst production process includes a step of reacting a gas of a compound containing a metal element M selected from titanium, iron, niobium, zirconium and tantalum, with a hydrocarbon gas, a nitrogen compound gas and an oxygen compound gas at 600 to 1600° C.

A solid-phase catalyst production process includes a step of heating a metal carbonitride containing a metal element M selected from titanium, iron, niobium, zirconium and tantalum, in an inert gas containing oxygen gas.

[Gas-Phase Catalyst Production Processes]

Examples of the gas-phase catalyst production processes include gas-phase, one-stage reaction processes and gas-phase, two-stage reaction processes.

(Gas-Phase, One-Stage Reaction Processes)

In a gas-phase, one-stage reaction process, the reaction is completed in one stage using a reactor, for example a reactor 1 illustrated in FIG. 1a. In the one-stage reaction, for example, a gas of a compound containing the metal element M that has been diluted with a diluent gas such as nitrogen gas is supplied to an atmosphere in which flow a hydrocarbon gas, a nitrogen compound gas and an oxygen compound gas that have been diluted with a diluent gas such as nitrogen gas; and the gas of the metal element M-containing compound is reacted with the hydrocarbon gas, the nitrogen compound gas and the oxygen compound gas at 600 to 1600° C. to give the target catalyst. The production of the catalyst by the gas-phase, one-stage reaction process is advantageous in terms of step control because the reaction producing the catalyst can be completed in one stage.

The reaction temperature is more preferably not less than 800° C., still more preferably not less than 900° C., and particularly preferably not less than 1000° C. This reaction temperature gives sufficient energy for the homogeneous nucleation and the catalyst can be obtained as fine particles having a high specific surface area. The upper limit of the reaction temperature is not particularly limited. However, the reaction temperature is preferably not more than 1600° C. in view of economy.

The pressure in the reaction is preferably $0.50 \times 10^5$ to $20 \times 10^5$ Pa, more preferably $0.80 \times 10^5$ to $1.20 \times 10^5$ Pa, and still more preferably $0.90 \times 10^5$ to $1.05 \times 10^5$ Pa. Since the reaction often involves a strong odor gas such as ammonia gas, it is preferable that the reactor internal pressure be lower than the surrounding pressure to prevent the leakage of such a gas. For this purpose, the pressure inside the reactor is preferably maintained constant by, for example, discharging the gas from the reactor by means of a diaphragm pump while controlling the suction flow rate with a valve.

Figure 1B:
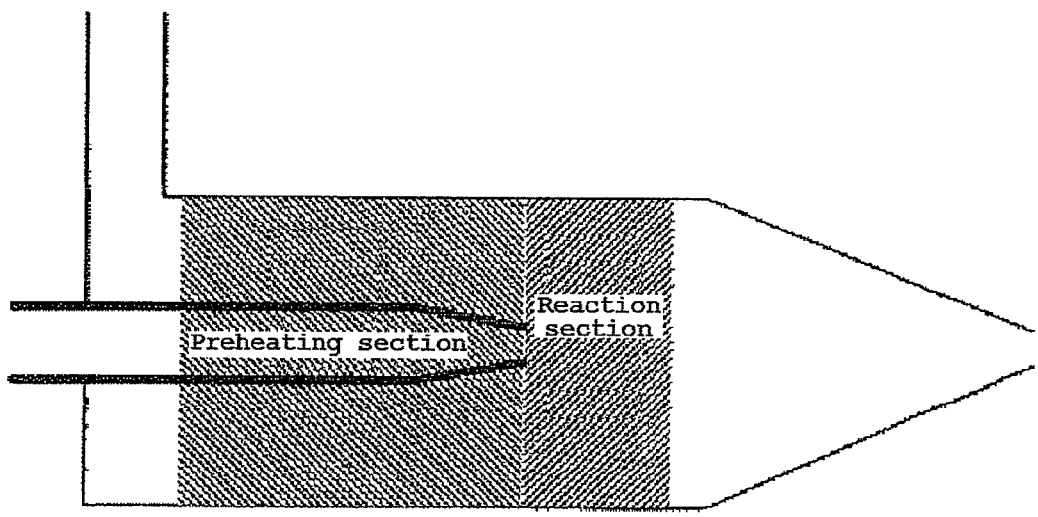
FIG. 1b is an enlarged schematic view illustrating the reactor in a one-stage gas phase reaction.

As illustrated in FIG. 1b, the reactor has a section in which the plurality of the introduced gases is preheated before they are mixed together. (Hereinafter, the section is also referred to as "preheating section".) The preheating section is maintained at the reaction temperature±100° C.

The average time for which each of the reaction gases dwells in the preheating section in the reactor (hereinafter, also referred to as "average dwell time in the preheating section") is defined as (volume (ml) of the preheating section)/(flow rate (ml/sec) of the reaction gas). The reaction gas flows through the preheating section via either the flow channel inside the nozzle or the flow channel outside the nozzle. In both of these two flow channels, the average dwell time in the preheating section is preferably 0.1 sec to 4000 sec, more preferably 0.2 sec to 2000 sec, and still more preferably 0.3 sec to 100 sec. The longer the average dwell time in the preheating section, the more sufficiently the gases are heated and the higher the temperature at which the reaction takes place. However, an excessively long average dwell time in the preheating section may decrease the productivity.

Further, as illustrated in FIG. 1b, the reactor has a reaction section. In the reaction section, the plurality of the introduced gases that have been mixed together is reacted.

The average time for which each of the reaction gases dwells in the reaction section in the reactor (hereinafter, also referred to as "average dwell time in the reaction section") is defined as (volume (ml) of the reaction section)/(flow rate (ml/sec) of the reaction gas). The average dwell time in the reaction section substantially corresponds to the reaction time of the reaction. The average dwell time in the reaction section is preferably 0.001 sec to 400 sec, more preferably 0.005 sec to 20 sec, and still more preferably 0.1 sec to 5 sec. The longer the average dwell time in the reaction section, the more sufficiently the gases are mixed and the longer the gases are reacted together, resulting in smaller proportions of unreacted material gases. However, an excessively long average dwell time in the reaction section may induce the growth and aggregation of the particles and the properties of the resultant catalyst may be deteriorated.

(Gas-Phase, Two-Stage Reaction Processes)

Figure 2:
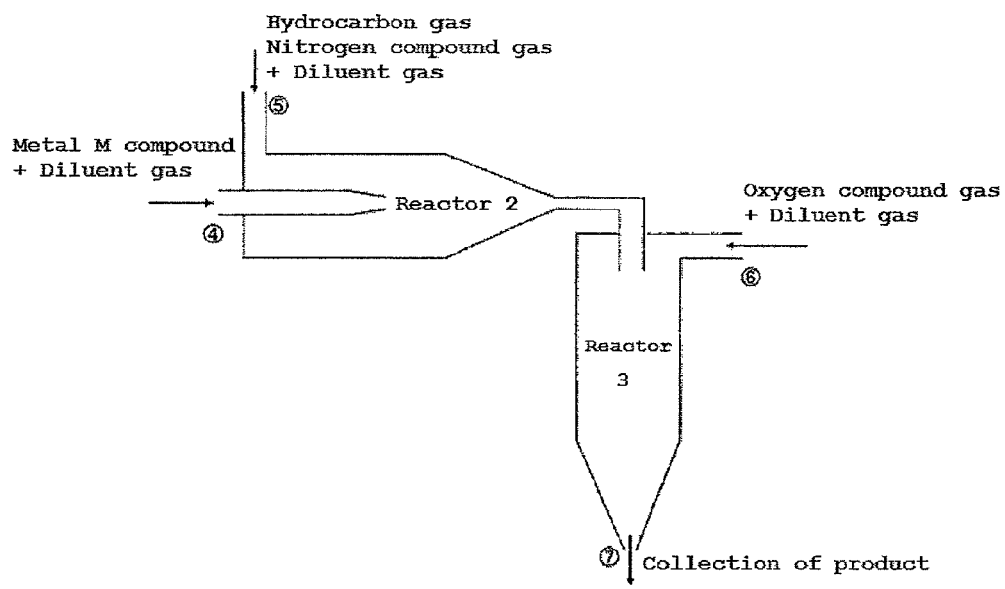
FIG. 2 is a schematic view illustrating a reactor in a two-stage gas phase reaction.

In a gas-phase, two-stage reaction process, the reaction is carried out in two stages using reactors, for example a reactor 2 and a reactor 3 illustrated in FIG. 2. In the first stage of the two-stage reaction, for example, a gas of a compound containing the metal element M that has been diluted with a diluent gas such as nitrogen gas is supplied to an atmosphere in which flow a hydrocarbon gas and a nitrogen compound gas that have been diluted with a diluent gas such as nitrogen gas; and the gas of the metal element M-containing compound is reacted with the hydrocarbon gas and the nitrogen compound gas to give a compound of the metal element M, carbon and nitrogen. In the second stage, the reaction product from the first stage is directly fed to the second-stage reactor 3 without being collected and is reacted with an oxygen compound gas, for example water, to give the target catalyst.

In the case of the two-stage reaction, the reaction temperature may be individually set in the first stage and the second stage. Accordingly, the temperature may be set to the optimum lowest temperature for accomplishing the reaction in each of the stages. In this manner, the growth of the particles due to excessive heating can be prevented and a relatively fine particulate catalyst can be easily obtained.

In performing the reaction in two stages, the formation of bonds between the metal element M and carbon in the first stage can be facilitated by increasing the reaction temperature in the first stage. The formation of the metal element M-carbon bonds is preferable from the viewpoint of catalytic activity and further because the consumption of carbon contained in the catalyst is retarded.

The reaction temperature in the first stage is preferably not less than 1000° C., more preferably not less than 1300° C., and still more preferably not less than 1500° C. This reaction temperature tends to ensure that the metal element M-carbon bonds remain in the obtainable catalyst.

The upper limit of the reaction temperature in the first stage is not particularly limited. However, the reaction temperature is preferably not more than 1800° C.

The pressure in the reaction in the first stage is preferably $0.60 \times 10^5$ to $30 \times 10^5$ Pa, more preferably $0.90 \times 10^5$ to $2.0 \times 10^5$ Pa, and still more preferably $0.95 \times 10^5$ to $1.1 \times 10^5$ Pa. Since the reaction often involves a strong odor gas such as ammonia gas, it is preferable that the reactor internal pressure be lower than the surrounding pressure to prevent the leakage of such a gas. For this purpose, similarly to the gas-phase, one-stage reaction process, the pressure inside the reactor is preferably maintained constant by, for example, discharging the gas from the reactor by means of a diaphragm pump while controlling the suction flow rate with a valve.

Similarly to the gas-phase, one-stage reaction process, the reactor in the first stage has a preheating section. The average dwell time in the preheating section is defined as (volume (ml) of the preheating section)/(flow rate (ml/sec) of the reaction gas). The reaction gas flows through the preheating section via either the flow channel inside the nozzle or the flow channel outside the nozzle. In both of these two flow channels, the average dwell time in the preheating section is preferably 0.05 sec to 400 sec, more preferably 0.1 sec to 200 sec, and still more preferably 0.2 sec to 50 sec. The longer the average dwell time in the preheating section, the more sufficiently the gases are heated and the higher the temperature at which the reaction takes place. However, an excessively long average dwell time in the preheating section may decrease the productivity.

In the reactor in the first stage, the average dwell time in the reaction section is preferably 0.001 sec to 200 sec, more preferably 0.005 sec to 20 sec, and still more preferably 0.05 sec to 4 sec. The longer the average dwell time in the reaction section, the more sufficiently the gases are mixed and the longer the gases are reacted together, resulting in smaller proportions of unreacted material gases. However, an excessively long average dwell time in the reaction section may induce the growth and aggregation of the particles and the properties of the resultant catalyst may be deteriorated.

In the reaction in the second stage, the metal compound formed in the first stage is reacted with an oxygen compound.

The reaction temperature is more preferably not less than 800° C. To increase the reaction rate, the reaction temperature is still more preferably not less than 900° C. The reaction temperature is particularly preferably not less than 1000° C., in which case the obtainable catalyst shows higher activity.

The upper limit of the reaction temperature in the second stage is not particularly limited. However, the reaction temperature is preferably not more than 1300° C.

The pressure in the reaction in the second stage is preferably $0.40 \times 10^5$ to $15 \times 10^5$ Pa, more preferably $0.60 \times 10^5$ to $2.0 \times 10^5$ Pa, and still more preferably $0.90 \times 10^5$ to $1.1 \times 10^5$ Pa. Similarly to the gas-phase, one-stage reaction process, the pressure inside the reactor is preferably maintained constant by, for example, discharging the gas from the reactor by means of a diaphragm pump while controlling the suction flow rate with a valve.

The reactor in the second stage does not usually have a nozzle.

The average time for which each of the reaction gases dwells in the reaction section in the reactor (hereinafter, also referred to as "average dwell time in the reaction section") is defined as (volume (ml) of the reaction section)/(flow rate (ml/sec) of the reaction gas). The average dwell time in the reaction section substantially corresponds to the reaction time of the reaction. The average dwell time in the reaction section is preferably 0.01 sec to 20000 sec, more preferably 0.1 sec to 10000 sec, and still more preferably 0.5 sec to 500 sec. The longer the average dwell time in the reaction section, the more sufficiently the gases are mixed and the longer the gases are reacted together, resulting in smaller proportions of unreacted material gases. However, an excessively long average dwell time in the reaction section may induce the growth and aggregation of the particles and the properties of the resultant catalyst may be deteriorated.

(Materials Used in Gas-Phase Processes)

Examples of the materials for obtaining the gases of compounds containing the metal element M for use in the gas-phase catalyst production processes include metal element M halides such as titanium chloride, iron chloride, niobium chloride, zirconium chloride, tantalum chloride, titanium bromide, iron bromide, niobium bromide, zirconium bromide, tantalum bromide, titanium iodide, iron iodide, niobium iodide, zirconium iodide and tantalum iodide, and metal element M alkoxides such as titanium methoxide, iron methoxide, niobium methoxide, zirconium methoxide, tantalum methoxide, titanium ethoxide, iron ethoxide, niobium ethoxide, zirconium ethoxide, tantalum ethoxide, titanium propoxide, iron propoxide, niobium propoxide, zirconium propoxide, tantalum propoxide, titanium butoxide, iron butoxide, niobium butoxide, zirconium butoxide and tantalum butoxide. Of these, titanium chloride, iron chloride, niobium chloride, zirconium chloride and tantalum chloride are preferable because of material availability. In the case where the material feed rate is controlled while blocking the outside air, it is preferable to use a material that is liquid at ordinary temperature, for example titanium chloride or the metal alkoxide. The use of such a material is advantageous in that the feed rate can be controlled easily.

In an embodiment, the material for the gas of the metal element M-containing compound is fed to a glass evaporator with the use of, for example, a metering feeder, a syringe pump or a tube pump, and is gasified. The gasified material is supplied to the reactor, thereby performing the reaction. The gasified material may be supplied to the reactor directly, or may be preferably supplied after diluted with a gas that is inexpensive and is low in reactivity such as nitrogen gas or argon gas. This dilution results in the catalyst having a higher specific surface area, namely a smaller primary particle diameter.

Further, diluting the gas of the metal element M-containing compound with an inert gas enables controlling the flow rate when the gas of the metal element M-containing compound is mixed with the reactant gas in the reactor. Here, the reactant gas in the reactor refers to a hydrocarbon gas, a nitrogen compound gas (such as ammonia gas) or an oxygen compound gas that will be described later, or a mixture gas containing two or three kinds of these gases.

The dilution rate of the gas of the metal element M-containing compound ((volume of the diluent gas/volume of the gas of the metal element M-containing compound)×100) is preferably 100% or more. The catalyst can be obtained as finer particles when the dilution rate is 200% or more. The specific surface area of the obtainable catalyst can be further increased by dilution at 500% or more. The fine particulate catalyst that has a high specific surface area shows high activity and is thus advantageous. If the dilution rate is excessively high, an ultrahigh temperature, for example 1600° C. or above, is required in order to form the metal element M-carbon bonds, or the chemical equilibrium shifts toward the material gas with the result that the material gas remains unreacted and is discharged to the collection system. Accordingly, the dilution rate is preferably 10000% or less. In order to increase the productivity per unit time, the dilution rate is more preferably 5000% or less.

The hydrocarbon gases for use in the processes of the invention are not particularly limited. Examples include methane gas, ethane gas, propane gas, butane gas, hexane gas, heptane gas and benzene gas. Of these, methane gas is preferable because it has high reactivity and the metal element M-carbon bonds can be formed even at a relatively low temperature, and further because the energy required for the reaction is small. It is also preferable to make use of propane gas that is inexpensive and is easily available in the industry.

The hydrocarbon gas may be supplied to the reactor directly, or may be preferably supplied after diluted with a gas that is inexpensive and is low in reactivity such as nitrogen gas or argon gas. This dilution results in the catalyst having a higher specific surface area, namely a smaller primary particle diameter.

The dilution rate of the hydrocarbon gas ((volume of the diluent gas/volume of the hydrocarbon gas)×100) is preferably 50% or more. The catalyst can be obtained as finer particles when the dilution rate is 100% or more. The specific surface area of the obtainable catalyst can be further increased by dilution at 200% or more. The fine particulate catalyst that has a high specific surface area shows high activity and is thus advantageous. If the dilution rate is excessively high, an ultrahigh temperature, for example 1600° C. or above, is required in order to form the metal element M-carbon bonds, or the chemical equilibrium shifts toward the material gas with the result that the hydrocarbon gas remains unreacted and is discharged to the collection system. Accordingly, the dilution rate is preferably 5000% or less. In order to increase the productivity per unit time, the dilution rate is preferably 2500% or less.

The nitrogen compound gases for use in the processes of the invention are not particularly limited. Examples include ammonia gas, $N_2O$ gas, NO gas, acetonitrile gas and hydroxylamine gas. Of these gases, ammonia gas and acetonitrile gas are preferable because the compounds are relatively stable and can be handled easily. Ammonia gas has high reactivity with respect to the metal element M or carbon, and thus the target catalyst can be obtained even at a relatively low temperature.

The nitrogen compound gas as a material may be supplied to the reactor directly, or may be preferably supplied after diluted with a gas that is inexpensive and is low in reactivity such as nitrogen gas or argon gas. This dilution results in the catalyst having a higher specific surface area, namely a smaller primary particle diameter.

The dilution rate of the nitrogen compound gas ((volume of the diluent gas/volume of the nitrogen compound gas)×100) is preferably 100% or more. The catalyst can be obtained as finer particles when the dilution rate is 200% or more. The specific surface area of the obtainable catalyst can be further increased by dilution at 500% or more. The fine particulate catalyst that has a high specific surface area shows high activity and is thus advantageous. Since the metal element M-nitrogen bonds are formed more easily than the metal element M-carbon bonds, it is preferable that at least the nitrogen compound gas be supplied at a lower concentration than the hydrocarbon concentration and that the total volume of the nitrogen compound gas supplied to the reactor per unit time be smaller than the total volume of the hydrocarbon gas per unit time.

If the dilution rate of the nitrogen compound gas is excessively high, a high temperature, for example 1200° C. or above, is required in order to form the metal element M-nitrogen bonds, or the chemical equilibrium shifts toward the material gas with the result that the nitrogen compound gas remains unreacted and is discharged to the collection system. Accordingly, the dilution rate is preferably 20000% or less. In order to increase the productivity per unit time, the dilution rate is preferably 10000% or less.

As described above, the hydrocarbon gas and the nitrogen compound gas that are supplied for reaction with the gas of the metal element M-containing compound have the appropriate dilution rates. In a small-scale experiment, the flow rates of the hydrocarbon gas and the nitrogen compound gas may be controlled using a float flowmeter or a mass flowmeter having a flow rate control function. In small-scale catalyst production, it is preferable to use a mass flowmeter capable of more accurate flow rate control.

In large-scale catalyst production, the hydrocarbon gas and the nitrogen compound gas (such as ammonia gas) can be obtained in constant flow rates by applying predetermined amounts of heat to the liquefied hydrocarbon and the liquid nitrogen compound with a heater. In this manner, the desired amounts of the hydrocarbon gas and the nitrogen compound gas (such as ammonia gas) can be supplied to the reactor without an expensive mass flowmeter. Thus, the flow rate control by means of heat is preferable for the industrial scale production of the catalyst.

In the production process of the invention, although the working mechanism is not fully understood, gasifying an oxygen compound such as oxygen, water, methanol, ethanol, propanol or butanol and supplying the gas to the reaction system results in improved activity of the catalyst. In particular, oxygen, water and methanol are preferable from the viewpoints of cost and high reactivity. Of the oxygen compounds, water is more preferable because the target reaction can be performed more safely without the risk of explosion. The oxygen compound may be supplied to the reactor directly, or may be more preferably supplied after diluted with a gas that is inexpensive and is low in reactivity such as nitrogen gas or argon gas. This dilution results in the catalyst having a higher specific surface area, namely a smaller primary particle diameter.

The dilution rate of the oxygen compound gas ((volume of the diluent gas/volume of the oxygen compound gas)×100) is preferably 1000% or more. The catalyst can be obtained as finer particles when the dilution rate is 2000% or more. The specific surface area of the obtainable catalyst can be further increased by dilution at 5000% or more. The fine particulate catalyst that has a high specific surface area shows high activity and is thus advantageous.

The oxygen compound gas easily reacts (oxidizes) with respect to both the metal element M and carbon. Thus, it is preferable that the oxygen compound gas be supplied in a lower concentration than the hydrocarbon gas concentration or the nitrogen compound gas concentration and that the total volume of the oxygen compound gas supplied to the reactor per unit time be smaller than the total volume of the hydrocarbon gas or the nitrogen compound gas per unit time.

In the catalyst production process of the invention, it is considered that the carbon bonds extend starting from the metal element M during the reaction, forming the metal element M-carbon-carbon-carbon bonds. The catalyst obtained by the inventive production process shows oxygen reduction activity probably because of the presence of the metal element M. Thus, it is supposed that the metal element M and carbon are chemically bonded.

The catalyst of the invention often contains impurities generated in the aforementioned reaction steps, for example the starting materials and byproducts. For the catalyst to show the activity, it is desired that the catalyst have the metal element M-carbon-carbon-carbon bonds and the concentration of the bonds be high. However, this does not expel the presence of the starting materials or byproducts. The starting materials or byproducts provide enhanced conductivity and thereby help the catalyst exhibit a catalytic performance at times. The starting materials or byproducts are not particularly limited, and examples thereof include oxides, nitrides, carbides and carbonitrides of the metal elements M. Of these, the catalyst preferably contains an oxide of the metal element M at not less than 1 wt %, and more preferably not less than 5 wt %. The presence of the metal element M oxide in the catalyst may be confirmed by X-ray diffractometry.

A diffraction peak in X-ray diffractometry refers to a peak that is observed at a specific diffraction angle and a specific diffraction intensity when a sample (crystal) is irradiated with X-rays at various angles. In the invention, a signal that is detected with a signal (S) to noise (N) ratio (S/N) of 2 or more is regarded as a diffraction peak. Here, the noise (N) is the width of the baseline.

The X-ray diffractometer may be powder X-ray diffractometer Rigaku RAD-RX. The measurement conditions may be X-ray output (Cu-K$\alpha$): 50 kV, 180 mA; scan axis: $\theta/2\theta$; measurement angles ($2\theta$): 10° to 89.98°; measurement mode: FT; scanning width: 0.02°; sampling time: 0.70 sec; DS, SS and RS: 0.5°, 0.5° and 0.15 mm; goniometer radius: 185 mm.

[Solid-Phase Catalyst Production Processes]

A solid-phase catalyst production process includes a step (hereinafter, also referred to as "solid-phase step 1") in which a mixture that contains a compound containing the metal element M, a carbon-source material and a nitrogen-source material is heated in the solid phase to give a metal carbonitride containing the metal element M; and a step (hereinafter, also referred to as "solid-phase step 2") in which the metal carbonitride containing the metal element M is heated in an inert gas containing oxygen gas.

(Solid-Phase Step 1)

In the solid-phase step 1, a mixture that contains a metal element M-containing compound, a carbon-source material and a nitrogen-source material is heated in the solid phase to give a metal carbonitride containing the metal element M.

In the solid-phase step 1, the heating temperature is usually in the range of 500 to 2200° C., and preferably 800 to 2000° C. This heating temperature tends to ensure that the obtainable metal carbonitride has high crystallinity and the amount of unreacted materials is small. Heating at temperatures below 500° C. tends to result in the metal carbonitride having low crystallinity and low reactivity. Heating temperatures above 2200° C. tend to result in easy sintering and crystal growth of the metal carbonitride.

In the solid-phase step 1, examples of the materials as the nitrogen source for the metal carbonitride include nitrogen gas and nitrogen compound mixture gases.

Examples of the metal element M-containing compounds for use in the solid-phase step 1 include oxides, carbides, nitrides, carbonates, nitrates, carboxylates such as acetates, oxalates and citrates, and phosphates of the metal elements M. Of the oxides, titanium oxide, iron oxide, niobium oxide, zirconium oxide, tantalum oxide, titanium hydroxide, iron hydroxide, niobium hydroxide, zirconium hydroxide and tantalum hydroxide are preferable because of easy availability. Preferred carbides are titanium carbide, iron carbide, niobium carbide, zirconium carbide and tantalum carbide. Preferred nitrides are titanium nitride, iron nitride, niobium nitride, zirconium nitride and tantalum nitride. Preferred carbonates are titanium carbonate, iron carbonate, niobium carbonate, zirconium carbonate and tantalum carbonate. The metal element M-containing compounds may be used singly, or two or more kinds may be used in combination.

Examples of the materials as the carbon source for the metal carbonitride include carbons. Examples of the carbons include carbon, carbon blacks, graphites, black leads, activated carbons, carbon nanotubes, carbon nanofibers, carbon nanohorns and fullerenes. The carbons preferably have smaller particle diameters. Such carbon particles have a larger specific surface area and react easily with the oxides. A suitable carbon material is carbon black (specific surface area: 100-300 $m^2/g$, for example XC-72 manufactured by Cabot Corporation).

The above materials may be used in any combination, and the obtainable metal carbonitride in the solid-phase step 1 may be heated in an inert gas containing an oxygen compound to give a catalyst which has a high oxygen reduction onset potential and high activity.

(Solid-Phase Step 2)

Next, there will be described the step in which the metal carbonitride from the solid-phase step 1 is heated in an inert gas containing oxygen gas to give a metal oxycarbonitride.

Examples of the inert gases include nitrogen gas, helium gas, neon gas, argon gas, krypton gas, xenon gas and radon gas. Nitrogen gas and argon gas are particularly preferable because of their relatively easy availability.

In the solid-phase step 2, the concentration of oxygen gas depends on the heating time and the heating temperature, but is preferably in the range of 0.1 to 5% by volume, and particularly preferably 0.5 to 2.5% by volume. When the oxygen gas concentration is in this range, the metal carbonitride is oxidized appropriately. If the oxygen gas concentration is less than 0.1% by volume, the oxidation tends to fail. If the concentration is in excess of 10% by volume, the oxidation tends to proceed excessively.

In the solid-phase step 2, the inert gas may further contain hydrogen gas. The concentration of the hydrogen gas depends on the heating time and the heating temperature, but is preferably in the range of 0.01 to 10% by volume, and particularly preferably 0.01 to 5% by volume. When the hydrogen gas concentration is in this range, the metal carbonitride is oxidized appropriately. The hydrogen gas concentration in excess of 10% by volume tends to increase the risk of explosion in the reactor.

In the invention, the gas concentration (% by volume) is determined under standard conditions.

The heating in the solid-phase step 2 is usually performed at a temperature in the range of 400 to 1400° C., and preferably 600 to 1200° C. This heating temperature ensures that the metal carbonitride is oxidized appropriately. If the heating temperature is below 400° C., the oxidation tends not to proceed. Heating at a temperature above 1400° C. tends to result in excessive oxidation and crystal growth.

The heating methods in the solid-phase step 2 include a stationary method, a stirring method, a dropping method and a powder capturing method.

In the dropping method, an induction furnace is heated to the predetermined heating temperature while passing the inert gas containing the trace amount of oxygen gas through the furnace; a thermal equilibrium is maintained at the temperature and the metal carbonitride is dropped and heated in a crucible which is the heating zone in the furnace. The dropping method is advantageous in that the aggregation and growth of particles of the metal carbonitride are minimized.

In the powder capturing method, the metal carbonitride is caused to suspend as particles in the inert gas atmosphere containing the trace amount of oxygen gas, and the metal carbonitride is captured and heated in a vertical tubular furnace controlled at the predetermined heating temperature.

In the dropping method, the heating time for the metal carbonitride is usually from 0.5 to 10 minutes, and preferably from 0.5 to 3 minutes. This heating time ensures that the metal carbonitride is oxidized appropriately. Heating for less than 0.5 minutes tends to result in partial formation of the metal oxycarbonitride. If the heating time exceeds 10 minutes, the oxidation tends to proceed excessively.

In the powder capturing method, the heating time for the metal carbonitride is from 0.2 second to 1 minute, and preferably from 0.2 to 10 seconds. This heating time ensures that the metal carbonitride is oxidized appropriately. Heating for less than 0.2 seconds tends to result in partial formation of the metal oxycarbonitride. If the heating time exceeds 1 minute, the oxidation tends to proceed excessively. When the heating is performed in a tubular furnace, the heating time for the metal carbonitride may be from 0.1 to 10 hours, and preferably from 0.5 to 5 hours. This heating time ensures that the metal carbonitride is oxidized appropriately. Heating for less than 0.1 hours tends to result in partial formation of the metal oxycarbonitride. If the heating time exceeds 10 hours, the oxidation tends to proceed excessively.

In the invention, the metal oxycarbonitride obtained by any of the aforementioned processes may be used directly as the catalyst according to the invention. In another embodiment, the metal oxycarbonitride may be crushed into finer particles.

The methods for crushing the metal oxycarbonitride include roll milling, ball milling, medium stirring milling, and crushing with an air flow crusher, a mortar or a crushing tank. To crush the metal oxycarbonitride into finer particles, an air flow crusher is preferably used. To facilitate the crushing in small amounts, the use of a mortar is preferable.

⟨Uses⟩

The catalysts according to the present invention may be used as alternative catalysts to platinum catalysts. For example, the catalysts of the invention may be used as fuel cell catalysts, exhaust gas treatment catalysts and organic synthesis catalysts, and are particularly useful as fuel cell catalysts.

A fuel cell catalyst layer according to the invention contains the above catalyst.

The fuel cell catalyst layer may be an anode catalyst layer or a cathode catalyst layer, and the catalyst of the invention may be used in any of these layers. Because the catalyst has excellent durability and high oxygen reducing ability, it is preferably used in a cathode catalyst layer.

In a preferred embodiment, the fuel cell catalyst layer of the invention further contains electron conductive particles. When the fuel cell catalyst layer containing the catalyst further contains electron conductive particles, the reduction current may be further increased. The increase of the reduction current is probably because the electron conductive particles establish electrical contacts within the catalyst to induce electrochemical reaction.

The electron conductive particles are generally used as a carrier for the catalyst.

Examples of the materials forming the electron conductive particles include carbons, conductive polymers, conductive ceramics, metals and conductive inorganic oxides such as tungsten oxide and iridium oxide. These materials may be used singly or in combination with one another. In particular, carbon particles having a large specific surface area or a mixture of carbon particles having a large specific surface area and other electron conductive particles is preferable. That is, the fuel cell catalyst layer according to a preferred embodiment contains the catalyst and carbon particles having a large specific surface area.

Examples of the carbons include carbon blacks, graphites, black leads, activated carbons, carbon nanotubes, carbon nanofibers, carbon nanohorns and fullerenes. If the particle diameter of carbon is excessively small, the carbon may not be able to form an electron conductive path. If the particle diameter is excessively large, the fuel cell catalyst layer tends to reduce gas diffusion properties or the catalyst usage rate tends to be lowered. The carbon particle diameter is preferably in the range of 10 to 1000 nm, and more preferably 10 to 100 nm.

When the electron conductive particles are formed of carbon, the mass ratio of the catalyst and the carbon (catalyst: electron conductive particles) is preferably in the range of 4:1 to 1000:1.

The conductive polymers are not particularly limited. Examples thereof include polyacetylene, poly-p-phenylene, polyaniline, polyalkylaniline, polypyrrole, polythiophene, polyindole, poly-1,5-diaminoanthraquinone, polyaminodiphenyl, poly(o-phenylenediamine), poly(quinolinium) salt, polypyridine, polyquinoxaline and polyphenylquinoxaline. Of these, polypyrrole, polyaniline and polythiophene are preferred, and polypyrrole is more preferred.

The fuel cell catalyst layer may contain a common polymer electrolyte used in fuel cell catalyst layers without limitation. Specific examples include perfluorocarbon polymers having a sulfonic acid group (such as Nafion (a 5% Nafion solution (DE521) manufactured by Du Pont Kabushiki Kaisha), hydrocarbon polymer compounds having a sulfonic acid group, polymer compounds doped with inorganic acids such as phosphoric acid, organic/inorganic hybrid polymers partially substituted with proton conductive functional groups, and proton conductors composed of a polymer matrix impregnated with a phosphoric acid solution or a sulfuric acid solution. Of these, Nafion (a 5% Nafion solution (DE521) manufactured by Du Pont Kabushiki Kaisha) is preferable.

The fuel cell catalyst layer according to the present invention may be used as an anode catalyst layer or a cathode catalyst layer. The fuel cell catalyst layer of the invention contains the catalyst that has high oxygen reducing ability and is resistant to corrosion in an acidic electrolyte even at high potential. Accordingly, the catalyst layer of the invention is suited for use in a fuel cell cathode (as a cathode catalyst layer). In particular, the catalyst layer is suitably provided in a cathode of a membrane electrode assembly in a polymer electrolyte fuel cell.

The catalyst may be dispersed on the electron conductive particles as the carrier by methods such as airborne dispersion methods and in-liquid dispersion methods. The in-liquid dispersion methods are preferable because the dispersion of the catalyst and the electron conductive particles in a solvent can be used in the production of the fuel cell catalyst layer. Exemplary in-liquid dispersion methods include an orifice-choked flow method, a rotational shear flow method and an ultrasonic method. The solvents used in the in-liquid dispersion methods are not particularly limited as long as the catalyst or the electron conductive particles are not corroded and are dispersed therein. Volatile liquid organic solvents and water are generally used.

When the catalyst is dispersed on the electron conductive particles, the electrolyte described above and a dispersant may be dispersed together.

The fuel cell catalyst layer may be formed by any methods without limitation. For example, a suspension containing the catalyst, the electron conductive particles and the electrolyte may be applied to an electrolyte membrane or a gas diffusion layer described later. The application methods include dipping, screen printing, roll coating and spraying. In another embodiment, a suspension containing the catalyst, the electron conductive particles and the electrolyte may be applied or filtered onto a substrate to form a fuel cell catalyst layer, and the catalyst layer may be transferred to an electrolyte membrane.

An electrode according to the present invention contains the fuel cell catalyst layer and a porous support layer.

The electrode of the invention may be used as a cathode or an anode. Because the inventive electrode has excellent durability and high catalytic performance, it is more advantageous from the industrial viewpoint that the electrode be used as a cathode.

The porous support layer is a layer which diffuses gas (hereinafter, also referred to as "gas diffusion layer"). The gas diffusion layers are not particularly limited as long as they have electron conductivity, high gas diffusion properties and high corrosion resistance. Carbon-based porous materials such as carbon paper and carbon cloth, and stainless steel and anticorrosive-coated aluminum foils for weight reduction may be generally used.

A membrane electrode assembly of the invention has a cathode, an anode and an electrolyte membrane between the cathode and the anode. The cathode and/or the anode is the electrode described hereinabove.

The electrolyte membranes may be general perfluorosulfonic acid electrolyte membranes or hydrocarbon electrolyte membranes. Further, polymer fine-pore membranes impregnated with liquid electrolyte, or porous membranes filled with polymer electrolyte may be used.

A fuel cell according to the present invention has the membrane electrode assembly described above.

The electrode reaction in a fuel cell takes place at a three-phase interface (electrolyte-electrode catalyst-reaction gas). Fuel cells are classified according to the used electrolytes into several types such as molten carbonate fuel cells (MCFC), phosphoric acid fuel cells (PAFC), solid oxide fuel cells (SOFC) and polymer electrolyte fuel cells (PEFC). In particular, the membrane electrode assembly of the invention may be preferably used in a polymer electrolyte fuel cell.

EXAMPLES

The present invention will be described in greater detail by presenting examples hereinbelow without limiting the scope of the invention.

In Examples and Comparative Examples, measurements were carried out by the following methods.
[Analytical Methods]
1. Powder X-Ray Diffractometry Samples were analyzed by powder X-ray diffractometry using Rotaflex manufactured by Rigaku Corporation.

A signal which was detected with a signal (S) to noise (N) ratio (S/N) of 2 or more was regarded as a diffraction peak. The noise (N) was the width of the baseline.
2. Raman Spectroscopy Samples were analyzed with Nicolet Almega XR manufactured by Thermo Fisher Scientific K. K., thereby recording Raman spectra of the samples. The reference was air. The laser output level was 1%, the laser wavelength was 532 nm, and the spectrometer aperture was 10 μm. The number of exposure was 32 times. The spectra were obtained in the range of 4000 to 400 $cm^{-1}$. The measurement was performed by applying the laser light to the sample that had been hermetically sealed with argon in a glass sample tube.
3. Elemental Analysis Carbon: Approximately 0.1 g of a sample was weighed out and analyzed with EMIA-110 manufactured by HORIBA, Ltd.

Nitrogen and oxygen: Approximately 0.1 g of a sample sealed in a Ni cup was analyzed with an ON analyzer (TC600) manufactured by LECO JAPAN CORPORATION.

Zirconium or titanium, and other metal elements M: Approximately 0.1 g of a sample was weighed on a platinum dish, and an acid was added thereto. The sample was then thermally decomposed. The thermal decomposition product was collected to a predetermined volume, diluted and analyzed with ICP-MS (ICP-OES VISTA-PRO) manufactured by SII.

Example 1

Catalyst 1: $TiC_xN_yO_z$ Synthesized by One-Stage Gas Phase Process 1-1. Preparation of Catalyst Titanium tetrachloride was supplied at 6 g/hr to a heating tube 1 that had been controlled at 160° C., and nitrogen gas was supplied thereto at 1 L/min, thereby obtaining a mixture gas 1 of titanium tetrachloride gas and nitrogen gas. Water was supplied at 0.1 g/hr to a heating tube 2 that had been controlled at 120° C., and nitrogen gas was supplied thereto at 100 ml/min, thereby obtaining a mixture gas 2 of vapor and nitrogen gas.

The mixture gas 1, the mixture gas 2, and a gas of 6 standard cc/min (hereinafter, referred to as "sccm") of ammonia gas and 60 sccm of methane gas that had been diluted with 100 ml/min of nitrogen gas were supplied to the reactor 1 illustrated in FIG. 1a. The reactor 1 was heated from outside to a temperature of 1200° C. In this manner, a reaction was performed among the titanium tetrachloride gas, the ammonia gas, the methane gas and the vapor.

After the reaction, the obtained dark grey product was collected using a rounded filter paper, washed with water and dried in vacuum. Thus, a catalyst (1) containing titanium, carbon, nitrogen and oxygen was obtained. The results of the elemental analysis of the catalyst (1) are described in Table 1.

1-2. XRD and Raman Spectroscopy of Catalyst

Figure 3:
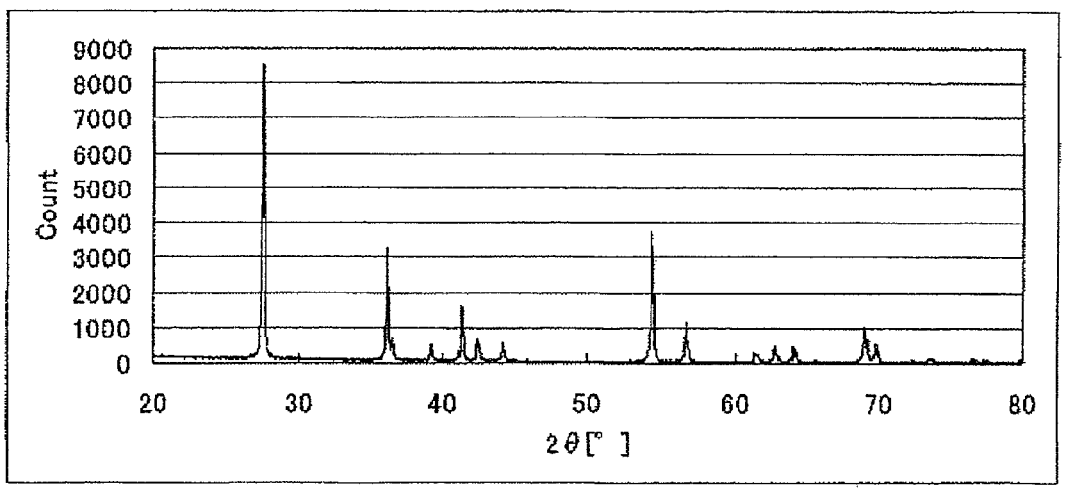
FIG. 3 is a powder X-ray diffraction spectrum of a catalyst (1) in Example 1.
Figure 4:
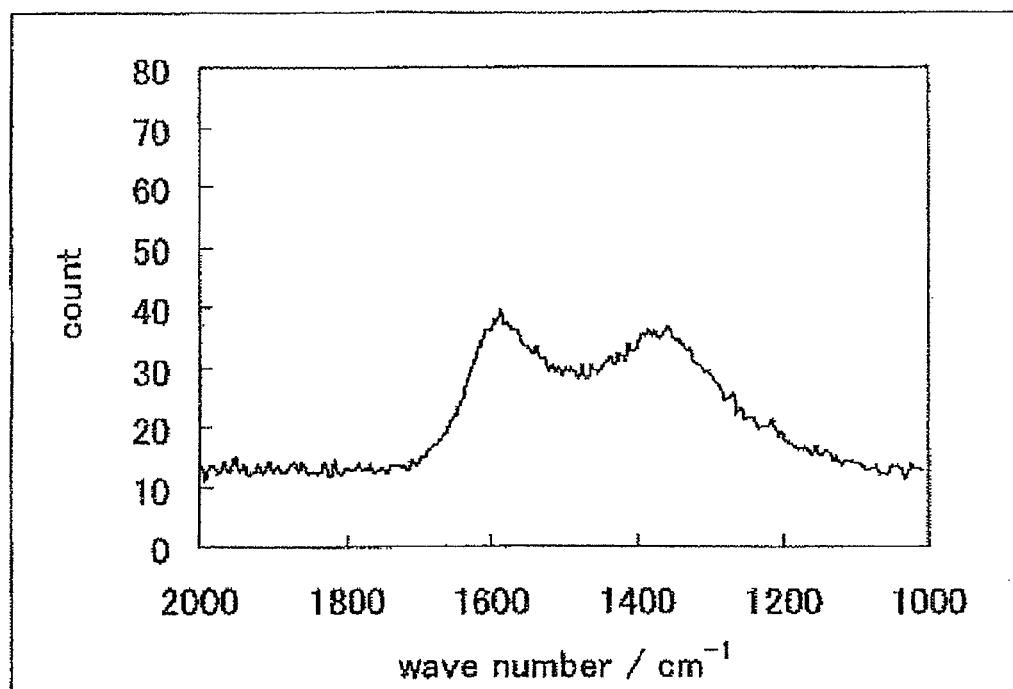
FIG. 4 is a Raman spectrum of the catalyst (1) in Example 1.

A powder X-ray diffraction spectrum and a Raman spectrum of the catalyst (1) are shown in FIG. 3 and FIG. 4, respectively. In FIG. 4, peaks were observed at 1340 $cm^{-1}$ to 1365 $cm^{-1}$ and at 1580 $cm^{-1}$ to 1610 $cm^{-1}$, with D/G being 0.89. According to Raman spectroscopy and the standard addition method, the concentration of sp2-bonded carbon and sp3-bonded carbon was 6 wt % in terms of VULCAN XC-72.

1-3. Evaluation of Oxygen Reducing Ability of Catalyst

The oxygen reducing ability of the catalyst (1) was determined in the following manner. The catalyst (1) in an amount of 0.095 g and carbon (XC-72 manufactured by Cabot Corporation) weighing 0.005 g were added to 10 g of a solution consisting of isopropyl alcohol:pure water=2:1 by weight. The mixture was ultrasonically stirred to give a suspended mixture. The mixture in a volume of 10 μl was applied onto a glassy carbon electrode (diameter: 5.2 mm, manufactured by Tokai Carbon Co., Ltd.) and was dried at 120° C. for 5 minutes. The dropping and drying operations were repeated until at least 1.0 mg of a fuel cell catalyst layer was formed on the carbon electrode surface. Subsequently, 10 μl of Nafion (registered trademark) (a 5% Nafion solution (DE521) manufactured by Du Pont Kabushiki Kaisha) diluted ten times with pure water was applied thereon and was dried at 120° C. for 1 hour. A fuel cell electrode (1) was thus manufactured.

The fuel cell electrode (1) manufactured above was evaluated for catalytic performance (oxygen reducing ability) as described below.

The fuel cell electrode (1) was polarized in a 0.5 mol/$dm^3$ sulfuric acid solution at 30° C. under an oxygen atmosphere or a nitrogen atmosphere at a potential scanning rate of 5 mV/sec, thereby recording a current-potential curve. As a reference, a reversible hydrogen electrode was polarized in a sulfuric acid solution of the same concentration.

In the current-potential curve obtained, the potential at which the reduction current started to differ by 0.5 μA/$cm^2$ or more between the polarization under the oxygen atmosphere and that under the nitrogen atmosphere was obtained as the oxygen reduction onset potential. The difference between the reduction currents was obtained as the oxygen reduction current.

The catalytic performance (oxygen reducing ability) of the fuel cell electrode (1) was evaluated based on the oxygen reduction onset potential and the oxygen reduction current.

In detail, the higher the oxygen reduction onset potential and the higher the oxygen reduction current, the higher the catalytic performance (oxygen reducing ability) of the fuel cell electrode (1).

Figure 5:
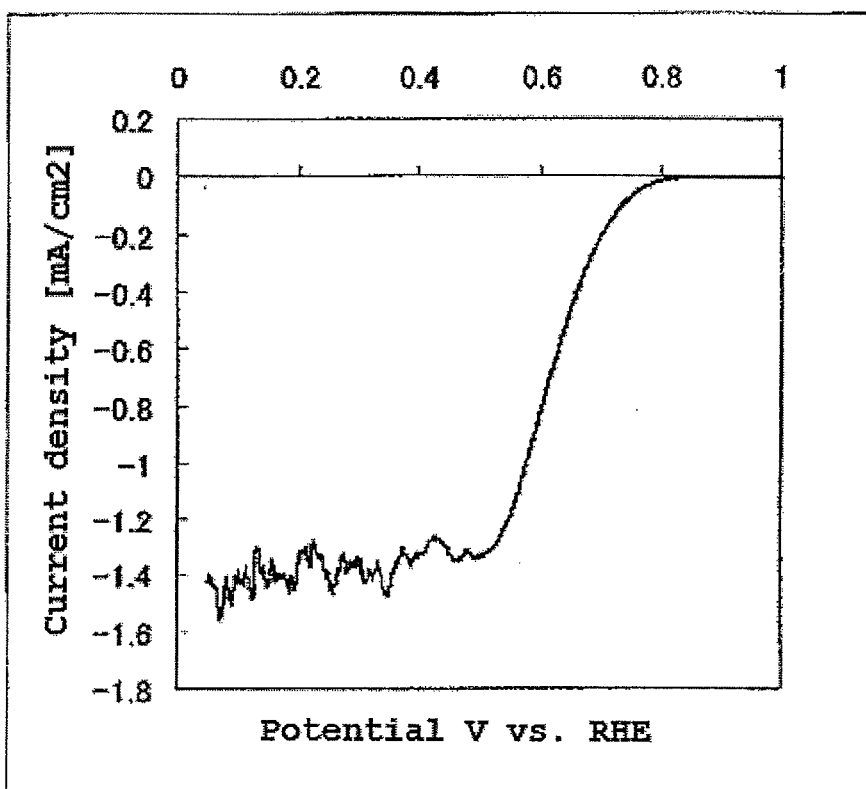
FIG. 5 is a graph showing an evaluation of the oxygen reducing ability of the catalyst (1) in Example 1.

The oxygen reduction current-oxygen reduction potential curve (hereinafter, also referred to as "current-potential curve") recorded during the above measurement is shown in FIG. 5.

The fuel cell electrode (1) manufactured in Example 1 had an oxygen reduction onset potential of 0.90 V (vs. NHE) and was found to have high oxygen reducing ability.

Example 2

Catalyst 2: $TiC_xN_yO_z$ Synthesized by Two-Stage Gas Phase Process 2-1. Preparation of Catalyst Titanium tetrachloride was supplied at 6 g/hr to a heating tube 3 that had been controlled at 160° C., and nitrogen gas was supplied thereto at 1 L/min, thereby obtaining a mixture gas 3 of titanium tetrachloride gas and nitrogen gas.

The mixture gas 3, and a gas of 6 sccm of ammonia gas and 60 sccm of methane gas that had been diluted with 100 ml/min of nitrogen gas were supplied to the reactor 2 illustrated in FIG. 2. The reactor 2 was heated from outside to a temperature of 1550° C. In this manner, a reaction was performed among the titanium tetrachloride gas, the ammonia gas and the methane gas.

Subsequently, water was supplied at 0.1 g/hr to a heating tube 4 that had been controlled at 120° C., and nitrogen gas was supplied thereto at 100 ml/min, thereby obtaining a mixture gas 4 of vapor and nitrogen gas. The mixture gas 4 and the reaction product from the reactor 2 were supplied to the reactor 3 illustrated in FIG. 2 that had been heated to 1000° C. from outside. In this manner, a reaction was carried out.

After the reaction, the obtained dark grey product was collected using a rounded filter paper, washed with water and dried in vacuum. Thus, a catalyst (2) containing titanium, carbon, nitrogen and oxygen was obtained. The results of the elemental analysis of the catalyst (2) are described in Table 1.

2-2. XRD and Raman Spectroscopy of Catalyst

Figure 6:
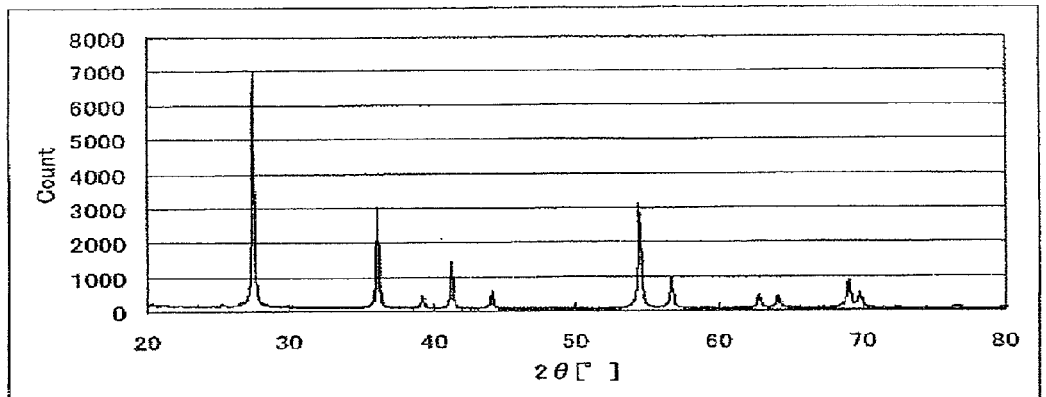
FIG. 6 is a powder X-ray diffraction spectrum of a catalyst (2) in Example 2.
Figure 7:
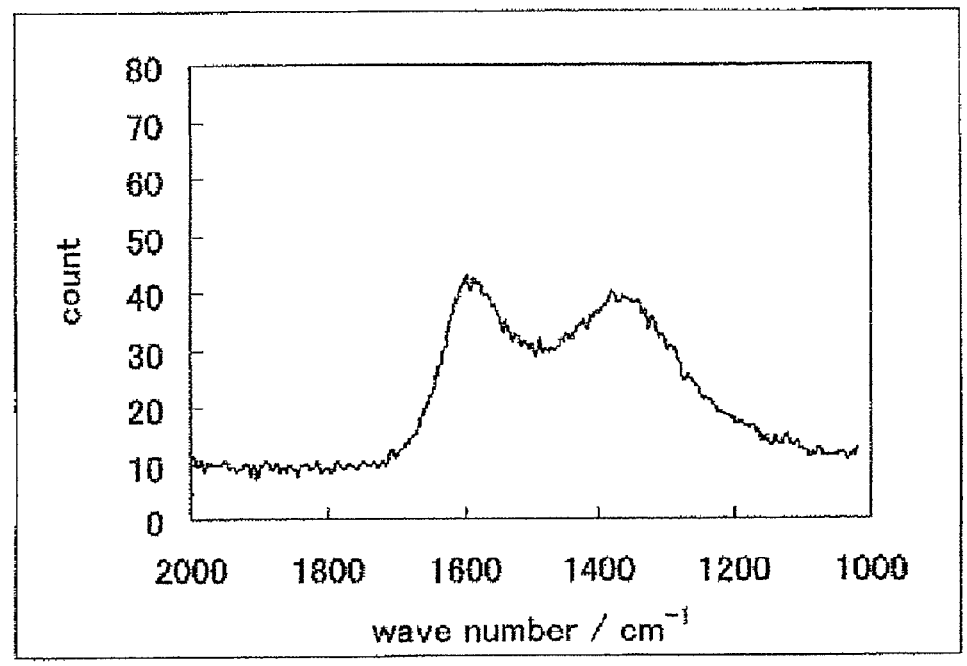
FIG. 7 is a Raman spectrum of the catalyst (2) in Example 2.

A powder X-ray diffraction spectrum and a Raman spectrum of the catalyst (2) are shown in FIG. 6 and FIG. 7, respectively. In FIG. 7, peaks were observed at 1340 $cm^{-1}$ to 1365 $cm^{-1}$ and at 1580 $cm^{-1}$ to 1610 $cm^{-1}$, with D/G being 0.90. According to Raman spectroscopy and the standard addition method, the concentration of sp2-bonded carbon and sp3-bonded carbon was 8 wt % in terms of VULCAN XC-72.

2-3. Evaluation of Oxygen Reducing Ability of Catalyst

The catalytic performance (oxygen reducing ability) was evaluated in the same manner as described in 1-3 of Example 1, except that the catalyst (1) was replaced by the catalyst (2).

Figure 8:
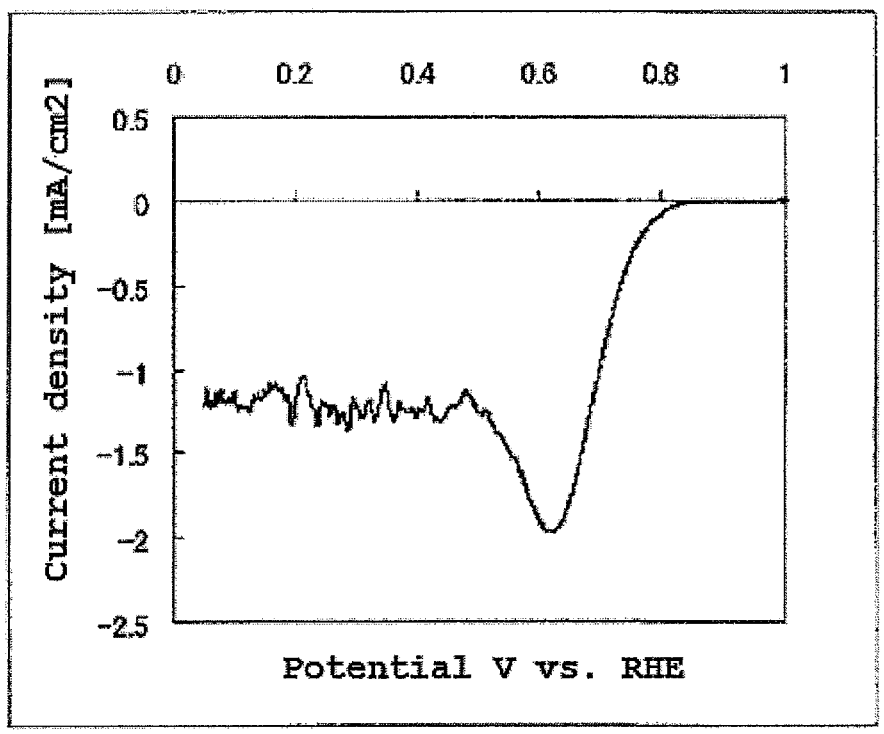
FIG. 8 is a graph showing an evaluation of the oxygen reducing ability of the catalyst (2) in Example 2.

The current-potential curve recorded during the measurement is shown in FIG. 8.

The fuel cell electrode (2) manufactured using the catalyst (2) from Example 2 had an oxygen reduction onset potential of 0.89 V (vs. NHE) and was found to have high oxygen reducing ability.

Example 3

Catalyst 3: $TiC_xN_yO_z$ Synthesized by Solid Phase Process 3-1. Preparation of Catalyst Titanium oxide (SUPER-TITANIA F6 manufactured by SHOWA DENKO K.K.) weighing 4 g and carbon (VULCAN XC72 manufactured by Cabot Corporation) weighing 1.5 g were sufficiently crushed and mixed together. The resultant powder mixture was heated in a tubular furnace in a nitrogen atmosphere at 1800° C. for 3 hours to give 3.0 g of titanium carbonitride. The titanium carbonitride was crushed in a mortar.

The crushed titanium carbonitride in an amount of 1.0 g was heated in a tubular furnace at 1000° C. for 3 hours while passing nitrogen gas containing 2% by volume of oxygen gas and 4% by volume of hydrogen gas. As a result, 1.28 g of an oxycarbonitride containing titanium (hereinafter, also referred to as "catalyst (3)") was obtained. The results of the elemental analysis of the catalyst (3) are described in Table 1.

3-2. XRD and Raman Spectroscopy of Catalyst

Figure 9:
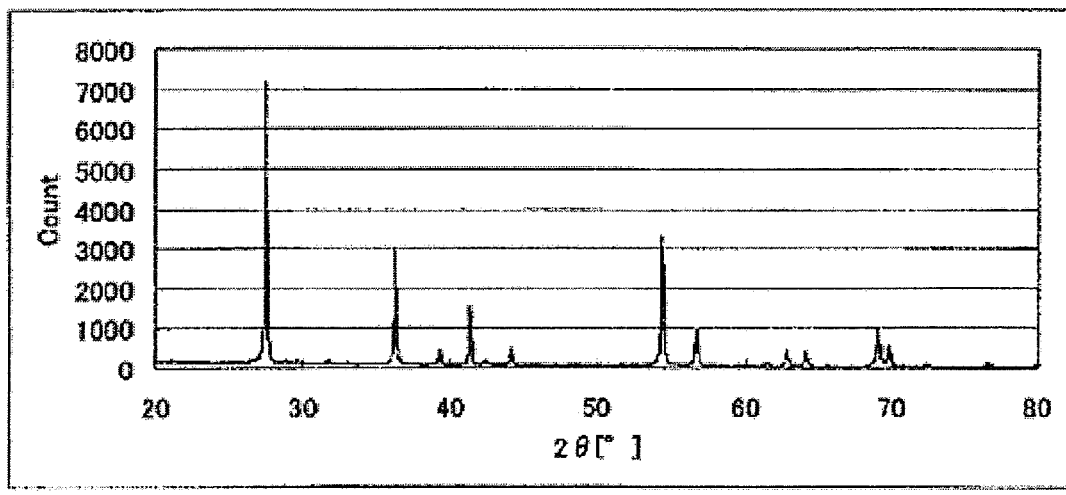
FIG. 9 is a powder X-ray diffraction spectrum of a catalyst (3) in Example 3.
Figure 10:
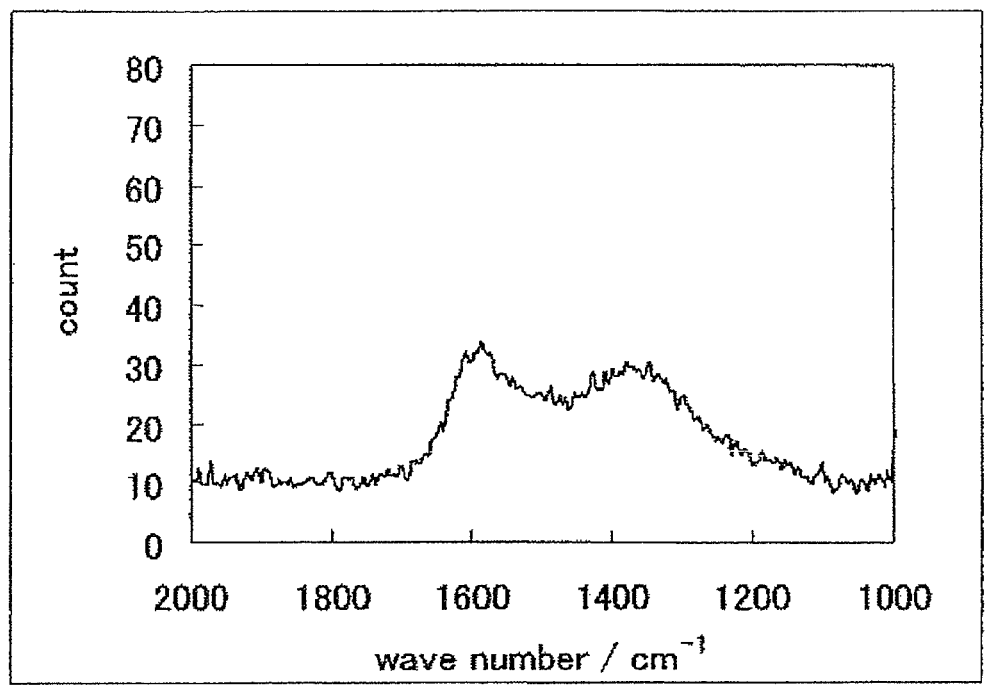
FIG. 10 is a Raman spectrum of the catalyst (3) in Example 3.

A powder X-ray diffraction spectrum and a Raman spectrum of the catalyst (3) are shown in FIG. 9 and FIG. 10, respectively. In FIG. 10, peaks were observed at 1340 cm$^{-1}$ to 1365 cm$^{-1}$ and at 1580 cm$^{-1}$ to 1610 cm$^{-1}$, with D/G being 0.84. According to Raman spectroscopy and the standard addition method, the concentration of sp2-bonded carbon and sp3-bonded carbon was 5 wt % in terms of VULCAN XC-72.

3-3. Evaluation of Oxygen Reducing Ability of Catalyst

The catalytic performance (oxygen reducing ability) was evaluated in the same manner as described in 1-3 of Example 1, except that the catalyst (1) was replaced by the catalyst (3).

Figure 11:
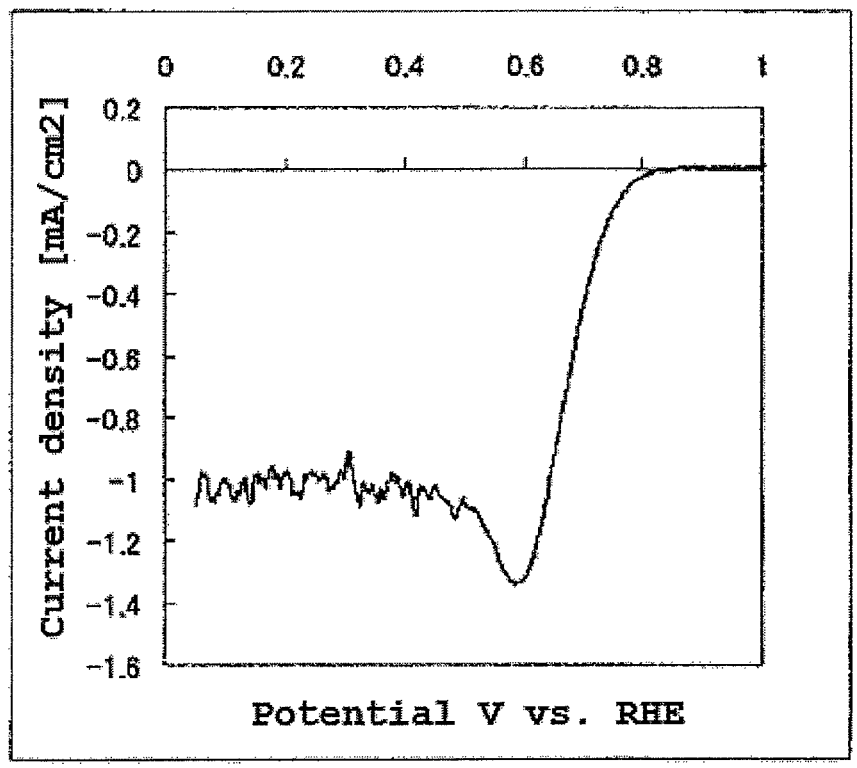
FIG. 11 is a graph showing an evaluation of the oxygen reducing ability of the catalyst (3) in Example 3.

The current-potential curve recorded during the measurement is shown in FIG. 11.

The fuel cell electrode (3) manufactured using the catalyst (3) from Example 3 had an oxygen reduction onset potential of 0.87 V (vs. NHE) and was found to have high oxygen reducing ability.

Example 4

Catalyst 4: ZrC$_x$N$_y$O$_z$ Synthesized by One-Stage Gas Phase Process 4-1. Preparation of Catalyst Zirconium isopropoxide (ZA-40 manufactured by Matsumoto Fine Chemical Co., Ltd.) was supplied at 7 g/hr to a heating tube 1 that had been controlled at 160° C., and nitrogen gas was supplied thereto at 1 L/min, thereby obtaining a mixture gas 5 of zirconium isopropoxide and nitrogen gas. Acetonitrile and n-hexane were supplied at 2 g/hr and 2 g/hr, respectively, to a heating tube 2 that had been controlled at 120° C., and nitrogen gas was supplied thereto at 100 ml/min, thereby obtaining a mixture gas 6 of acetonitrile, n-hexane and nitrogen gas.

The mixture gas 5, the mixture gas 6, and a gas of 1 sccm of oxygen gas and 4 sccm of hydrogen gas that had been diluted with 100 ml/min of nitrogen gas were supplied to the reactor 1 illustrated in FIG. 1a. The reactor 1 was heated from outside to a temperature of 1050° C. In this manner, a reaction was performed among zirconium isopropoxide, acetonitrile, n-hexane, oxygen and hydrogen.

After the reaction, the obtained black product was collected using a rounded filter paper, washed with water and dried in vacuum. Thus, a catalyst (4) containing zirconium, carbon, nitrogen and oxygen was obtained. The results of the elemental analysis of the catalyst (4) are described in Table 1.

4-2. XRD and Raman Spectroscopy of Catalyst

Figure 12:
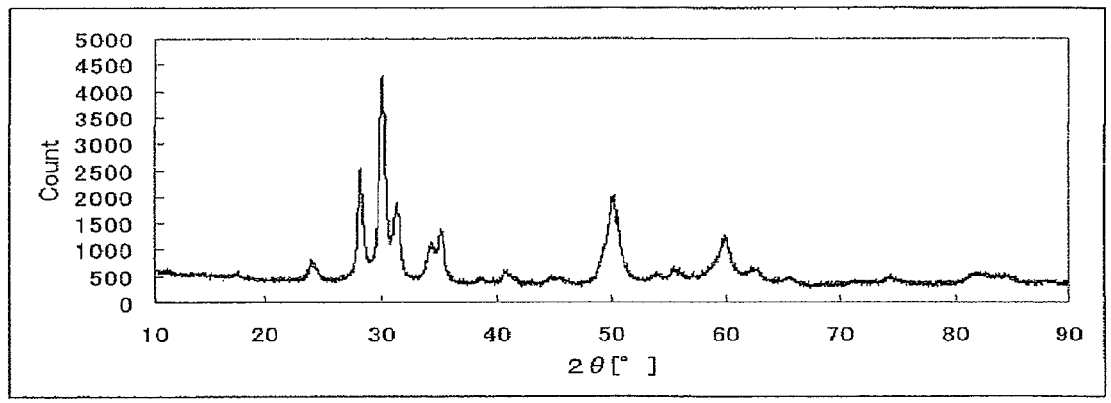
FIG. 12 is a powder X-ray diffraction spectrum of a catalyst (4) in Example 4.
Figure 13:
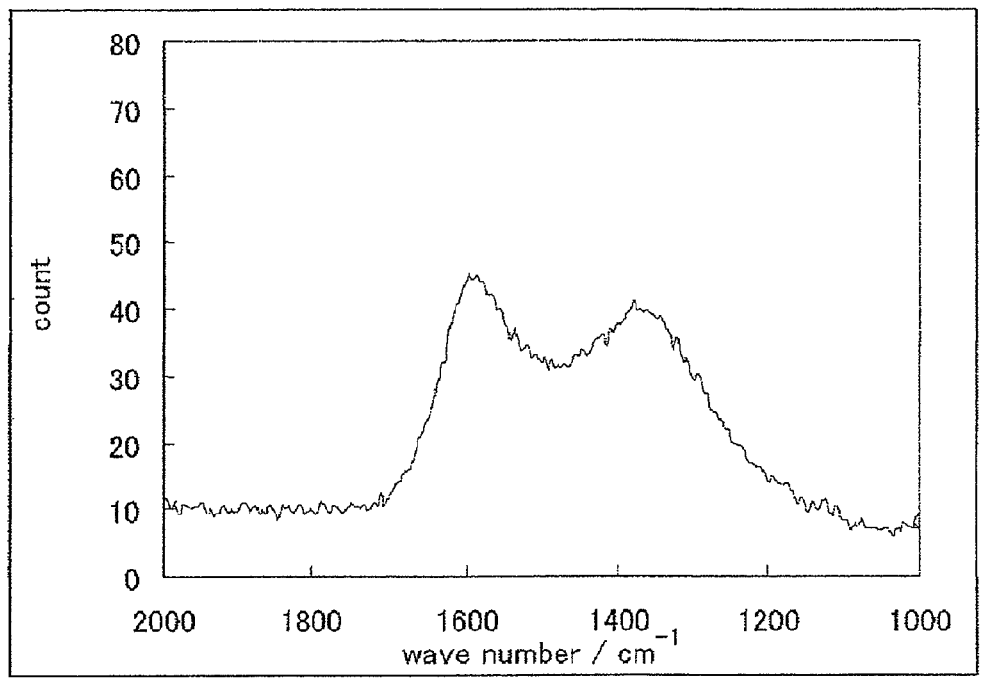
FIG. 13 is a Raman spectrum of the catalyst (4) in Example 4.

A powder X-ray diffraction spectrum and a Raman spectrum of the catalyst (4) are shown in FIG. 12 and FIG. 13, respectively. In FIG. 13, peaks were observed at 1340 cm$^{-1}$ to 1365 cm$^{-1}$ and at 1580 cm$^{-1}$ to 1610 cm$^{-1}$, with D/G being 0.91. According to Raman spectroscopy and the standard addition method, the concentration of sp2-bonded carbon and sp3-bonded carbon was 7 wt % in terms of VULCAN XC-72.

4-3. Evaluation of Oxygen Reducing Ability of Catalyst

The catalytic performance (oxygen reducing ability) was evaluated in the same manner as described in 1-3 of Example 1, except that the catalyst (1) was replaced by the catalyst (4).

Figure 14:
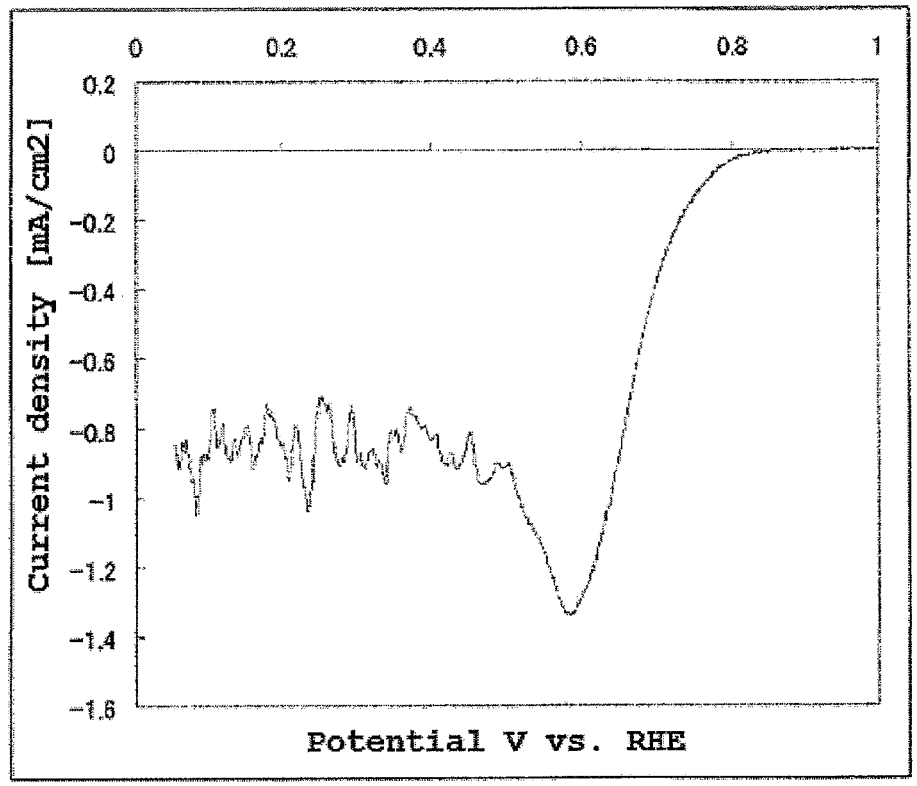
FIG. 14 is a graph showing an evaluation of the oxygen reducing ability of the catalyst (4) in Example 4.

The current-potential curve recorded during the measurement is shown in FIG. 14.

The fuel cell electrode (4) manufactured in Example 4 had an oxygen reduction onset potential of 0.88 V (vs. NHE) and was found to have high oxygen reducing ability.

Comparative Example 1

TiC$_x$N$_y$ 5-1. Preparation of Catalyst

Titanium carbonitride (purchased from Wako Pure Chemical Industries, Ltd., 40 nm) was used directly as a catalyst (5).

5-2. XRD and Raman Spectroscopy of Catalyst

Figure 15:
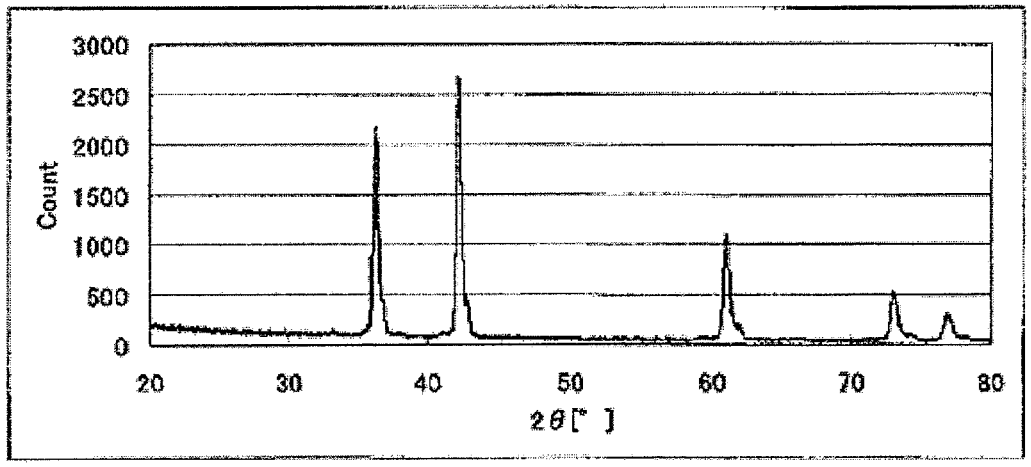
FIG. 15 is a powder X-ray diffraction spectrum of a catalyst (5) in Comparative Example 1.
Figure 16:
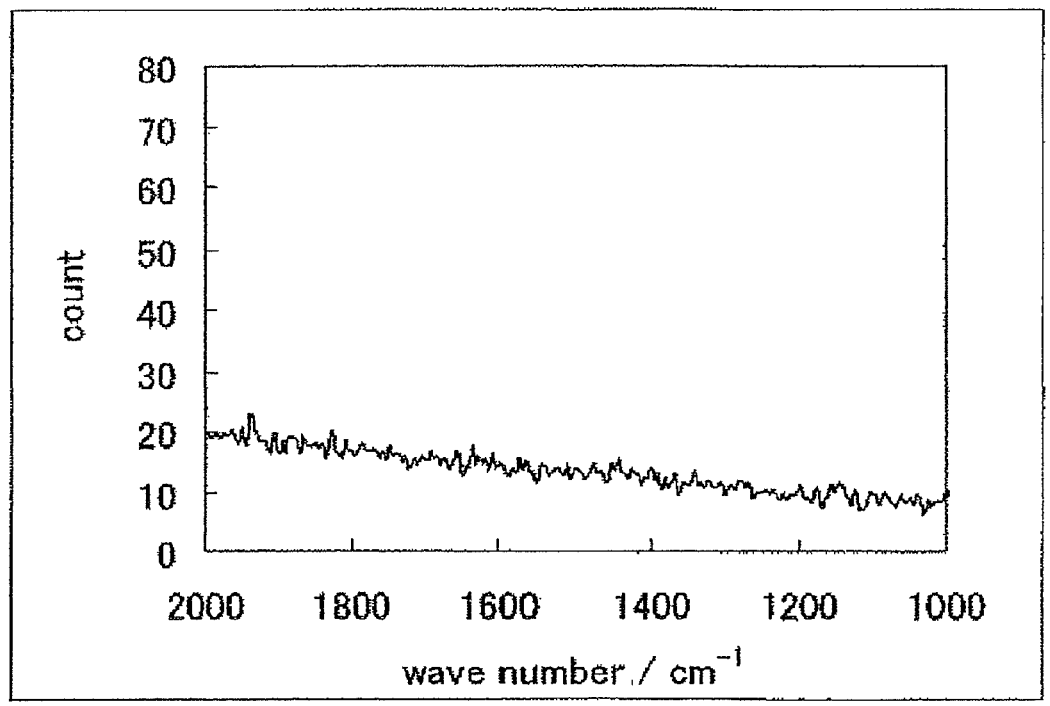
FIG. 16 is a Raman spectrum of the catalyst (5) in Comparative Example 1.

A powder X-ray diffraction spectrum and a Raman spectrum of the catalyst (5) are shown in FIG. 15 and FIG. 16, respectively. In FIG. 16, no peaks were observed at 1340 cm$^{-1}$ to 1365 cm$^{-1}$ or at 1580 cm$^{-1}$ to 1610 cm$^{-1}$. According to Raman spectroscopy and the standard addition method, the concentration of sp2-bonded carbon and sp3-bonded carbon was below 1 wt % in terms of VULCAN XC-72, and the presence of sp2-bonded carbon or sp3-bonded carbon was not clearly confirmed.

5-3. Evaluation of Oxygen Reducing Ability of Catalyst

The catalytic performance (oxygen reducing ability) was evaluated in the same manner as described in 1-3 of Example 1, except that the catalyst (1) was replaced by the catalyst (5).

Figure 17:
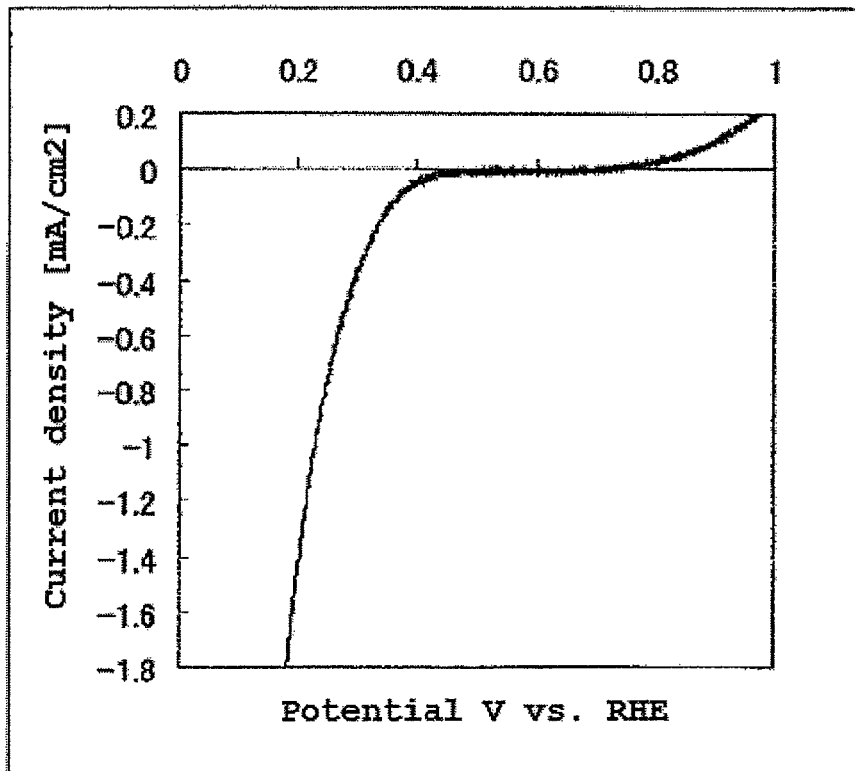
FIG. 17 is a graph showing an evaluation of the oxygen reducing ability of the catalyst (5) in Comparative Example 1.

The current-potential curve recorded during the measurement is shown in FIG. 17.

The fuel cell electrode (5) manufactured using the catalyst (5) in Comparative Example 1 had an oxygen reduction onset potential of 0.51 V (vs. NHE) and was found to have low oxygen reducing ability.

TABLE 1

| | Metal M | x | y | z | sp2 and sp3 carbon/ wt % | D/G | Oxygen reduction onset potential [V vs. NHE] |
|---|---|---|---|---|---|---|---|
| Ex. 1 | Ti | 0.12 | 0.15 | 1.25 | 6 | 0.89 | 0.90 |
| Ex. 2 | Ti | 0.15 | 0.09 | 1.59 | 8 | 0.90 | 0.91 |
| Ex. 3 | Ti | 0.14 | 0.10 | 1.55 | 5 | 0.84 | 0.87 |
| Ex. 4 | Zr | 0.51 | 0.12 | 1.66 | 7 | 0.91 | 0.88 |
| Comp. Ex. 1 | Ti | 0.52 | 0.51 | 0.01 | 0 | — | 0.51 |

INDUSTRIAL APPLICABILITY

The catalysts according to the invention are not corroded in acidic electrolytes or at high potential and have excellent durability and high oxygen reducing ability to find use in fuel cell catalyst layers, electrodes, membrane electrode assemblies and fuel cells.

The invention claimed is:

1. A fuel cell catalyst comprising a metal element M, carbon, nitrogen and oxygen, wherein the catalyst shows peaks at 1340 cm$^{-1}$ to 1365 cm$^{-1}$ and at 1580 cm$^{-1}$ to 1610 cm$^{-1}$ as analyzed by Raman spectroscopy and the metal element M is one selected from the group consisting of titanium, iron, zirconium and tantalum.

2. The fuel cell catalyst according to claim 1, wherein the ratio D/G is not less than 0.1 and not more than 10 wherein D is the height of the peak at 1340 cm$^{-1}$ to 1365 cm$^{-1}$ and G is the height of the peak at 1580 cm$^{-1}$ to 1610 cm$^{-1}$ (wherein the heights D and G do not include the height of the baseline).

3. The fuel cell catalyst according to claim 1, wherein the concentration of carbon forming sp2 bonds and sp3 bonds is not less than 1 wt % in terms of furnace black as measured by Raman spectroscopy and a standard addition method.

4. The fuel cell catalyst according to claim 1, which is represented by the compositional formula MC$_x$N$_y$O$_z$ (wherein x, y and z represent a ratio of the numbers of the atoms, $0.01 \leq x \leq 10000$, $0.01 \leq y \leq 10$, and $0.02 \leq z \leq 3$).

5. A process for producing the fuel cell catalyst of claim 1, which comprises a step of reacting a gas of a compound containing a metal element M, a hydrocarbon gas, a nitrogen compound gas and an oxygen compound gas at 600 to 1600° C., the metal element M being selected from the group consisting of titanium, iron, zirconium and tantalum.

6. A process for producing the fuel cell catalyst of claim 1, which comprises a step of heating a metal carbonitride containing a metal element M in an inert gas containing oxygen gas, the metal element M being selected from the group consisting of titanium, iron, zirconium and tantalum.

7. The process according to claim 6, wherein the heating is performed at a temperature in the range of 400 to 1400° C.

8. A fuel cell catalyst layer comprising the fuel cell catalyst of claim 1.

9. The fuel cell catalyst layer according to claim 8, which further comprises electron conductive particles.

10. An electrode comprising a fuel cell catalyst layer and a porous support layer, wherein the fuel cell catalyst layer is the fuel cell catalyst layer of claim 8.

11. A membrane electrode assembly comprising a cathode, an anode and an electrolyte membrane interposed between the cathode and the anode, wherein the cathode and/or the anode is the electrode of claim 10.

12. A fuel cell comprising the membrane electrode assembly of claim 11.

13. A polymer electrolyte fuel cell comprising the membrane electrode assembly of claim 11.

* * * * *